US010680395B2

(12) United States Patent
Chadwell

(10) Patent No.: US 10,680,395 B2
(45) Date of Patent: Jun. 9, 2020

(54) UNIVERSAL POWER INTERFACE SYSTEM AND METHODS TO USE THE SAME

(71) Applicant: Harper Engineering Co., Renton, WA (US)

(72) Inventor: David Chadwell, Renton, WA (US)

(73) Assignee: Harper Engineering Co., Renton, WA (US)

( * ) Notice: Subject to any disclaimer, the term of this patent is extended or adjusted under 35 U.S.C. 154(b) by 0 days.

(21) Appl. No.: 16/293,019

(22) Filed: Mar. 5, 2019

(65) Prior Publication Data

US 2019/0280441 A1 Sep. 12, 2019

Related U.S. Application Data

(60) Provisional application No. 62/639,319, filed on Mar. 6, 2018.

(51) Int. Cl.
*H01R 24/76* (2011.01)
*H02G 3/08* (2006.01)
(Continued)

(52) U.S. Cl.
CPC ............. *H01R 24/76* (2013.01); *H01R 13/05* (2013.01); *H01R 13/743* (2013.01); *H01R 27/00* (2013.01);
(Continued)

(58) Field of Classification Search
CPC ........... H01R 24/76; H01R 13/05; H02G 3/18
See application file for complete search history.

(56) References Cited

U.S. PATENT DOCUMENTS 3,437,738 A 4/1969 Wagner
4,166,934 A 9/1979 Marrero
(Continued)

FOREIGN PATENT DOCUMENTS

CN 10460047 A 5/2015
CN 104934796 A 9/2015
(Continued)

OTHER PUBLICATIONS

International Search Report and Written Opinion of PCT/US2019/020750, dated May 23, 2019, 16 pages.

*Primary Examiner* — Abdullah A Riyami
*Assistant Examiner* — Nader J Alhawamdeh
(74) *Attorney, Agent, or Firm* — Seed Intellectual Property Law Group LLP

(57) ABSTRACT

A power interface system is provided. The power interface system can include a power interface device coupleable to a structure, wherein the power interface device can include a receptacle region and a plurality of pin receiving apertures. The power interface system may include an electrical device module sized and shaped to be received in the receptacle region, the electrical device module having a plurality of contact pins, each of the plurality of contact pins sized and shaped to be coupleably received in one of the pin receiving apertures. The electrical device module can be rotatably moveable with respect to the receptacle region between an uncoupled orientation and a coupled orientation, with the electrical device module being secured to the power interface device in the coupled orientation. Related devices and methods are also provided.

19 Claims, 23 Drawing Sheets

(51) Int. Cl.
- *H02G 3/18* (2006.01)
- *H01R 13/05* (2006.01)
- *H01R 13/74* (2006.01)
- *H01R 27/00* (2006.01)
- *H02G 3/12* (2006.01)
- *H02G 3/20* (2006.01)
- *H01R 33/76* (2006.01)
- *H01R 13/625* (2006.01)
- *H01R 24/60* (2011.01)
- *H01R 107/00* (2006.01)

(52) U.S. Cl.
CPC .............. *H02G 3/081* (2013.01); *H02G 3/12* (2013.01); *H02G 3/18* (2013.01); *H02G 3/20* (2013.01); *H01R 13/625* (2013.01); *H01R 13/74* (2013.01); *H01R 24/60* (2013.01); *H01R 33/765* (2013.01); *H01R 2107/00* (2013.01)

(56) References Cited

U.S. PATENT DOCUMENTS

| | | | |
|---|---|---|---|
| 5,484,299 A | 1/1996 | Schlessinger | |
| 6,563,049 B2 | 5/2003 | May | |
| 7,232,336 B1 * | 6/2007 | Evans | H02G 3/086 439/535 |
| 8,910,377 B2 | 12/2014 | Gorman | |
| 9,437,978 B2 * | 9/2016 | Green | H01R 13/652 |
| 2016/0249477 A1 | 8/2016 | Rohmer et al. | |
| 2017/0033517 A1 | 2/2017 | Yoshioka et al. | |
| 2019/0280441 A1 * | 9/2019 | Chadwell | H01R 13/743 |

FOREIGN PATENT DOCUMENTS

| | | | | |
|---|---|---|---|---|
| JP | 2012-195098 A | | 10/2012 | |
| JP | 2012195098 A | * | 10/2012 | |
| WO | 2017-222458 A1 | | 12/2017 | |
| WO | WO-2017222458 A1 | * | 12/2017 | ............ H01R 13/44 |

* cited by examiner

UNIVERSAL POWER INTERFACE SYSTEM AND METHODS TO USE THE SAME

BACKGROUND

Technical Field

The present disclosure is related to universal power interface systems.

Description of the Related Art

Conventional electrical devices, such as power outlets, light switches, ceiling fans, light fixtures, etc. are generally hard-wired. For example, light switches are hard-wired to an electrical box disposed in a wall through which power is supplied. Similarly, power outlets are hard-wired to an electrical box disposed in a wall though which power is supplied. Likewise, other electrical devices, such as fans, light fixtures, etc., tend to be hard-wired in a similar manner.

Conventional electrical devices, such as those described above, for example, over time become outdated and are desirable to be replaced with newer, technologically advanced, and aesthetically pleasing replacements. For example, in some instances, a conventional power outlet may be replaced with one that includes a conventional power outlet and a USB outlet. For example, a conventional toggle light switch may be replaced with a modern push button switch, proximity switch, dimmer switch, photoelectric switch, etc., or vice versa. In some instances, it may be desirable to switch or replace a light fixture or a ceiling fan with different ones. It may also be desirable to replace a malfunctioning or damaged ceiling fan, light fixture, light switch, power outlet, or other electrical devices with ones that are functioning.

Replacing conventional electrical devices or installing new electrical devices can be time-consuming, complicated, labor-intensive, hazardous, and may require skilled labor. Thus, standardized electrical device power interfaces are desirable that simplify installation and uninstallation.

BRIEF SUMMARY

Implementations described herein provide systems, methods, devices, and apparatuses with efficient, modular, and robust form factors that simplify and modularize installation and uninstallation of various electrical devices. In one example non-limiting implementation, a power interface system can include a power interface device coupleable to a structure, where the power interface device may include a receptacle region and a plurality of pin receiving apertures. The power interface system can also include an electrical device module sized and shaped to be received in the receptacle region, the electrical device module having a plurality of contact pins, each of the plurality of contact pins sized and shaped to be coupleably received in one of the pin receiving apertures. The electrical device module can be rotatably moveable with respect to the receptacle region between an uncoupled orientation and a coupled orientation, with the electrical device module being secured to the power interface device in the coupled orientation.

In another example non-limiting implementation, a universal interface device configured to couple to an electrical device module can include a first pin receiving aperture, a second pin receiving aperture, a third pin receiving aperture, a fourth pin receiving aperture, and a fifth pin receiving aperture. At least one of the first, second, third, fourth, and fifth pin receiving apertures may have an arcuate shape which defines a rotary path along which the electrical device module can rotate between a coupled configuration and an uncoupled configuration.

In another example non-limiting implementation, a method can comprise inserting an electrical device module in a power interface device, and rotating the electrical device module in a first direction to couple the electrical device module to the power interface device.

DETAILED DESCRIPTION

In the following description, certain specific details are set forth in order to provide a thorough understanding of various disclosed implementations or embodiments. One skilled in the relevant art will recognize that embodiments or implementations may be practiced without one or more of these specific details. In other instances, well-known structures and devices associated with electrical devices, building or housing structures, walls, ceilings, wiring, electrical junction or switch boxes, and related apparatuses, devices, and methods may not be shown or described in detail to avoid unnecessarily obscuring descriptions of the embodiments or implementations.

Unless the context requires otherwise, throughout the specification and claims which follow, the word "comprise" and variations thereof, such as, "comprises" and "comprising" are to be construed in an open, inclusive sense, that is, as "including, but not limited to."

Reference throughout this specification to "one embodiment," "one implementation," "an embodiment," or "an implementation" means that a particular feature, structure or characteristic described in connection with the embodiment or implementation is included in at least one embodiment or implementation. Thus, the appearances of the phrases "in one embodiment," "in one implementation," "in an implementation," or "in an embodiment" in various places throughout this specification are not necessarily all referring to the same embodiment or implementation. Furthermore, the particular features, structures, or characteristics may be combined in any suitable manner in one or more embodiments or implementations.

As used in this specification and the appended claims, the singular forms "a," "an," and "the" include plural referents unless the content clearly dictates otherwise. It should also be noted that the term "or" is generally employed in its sense including "and/or" unless the content clearly dictates otherwise.

Figure 1:
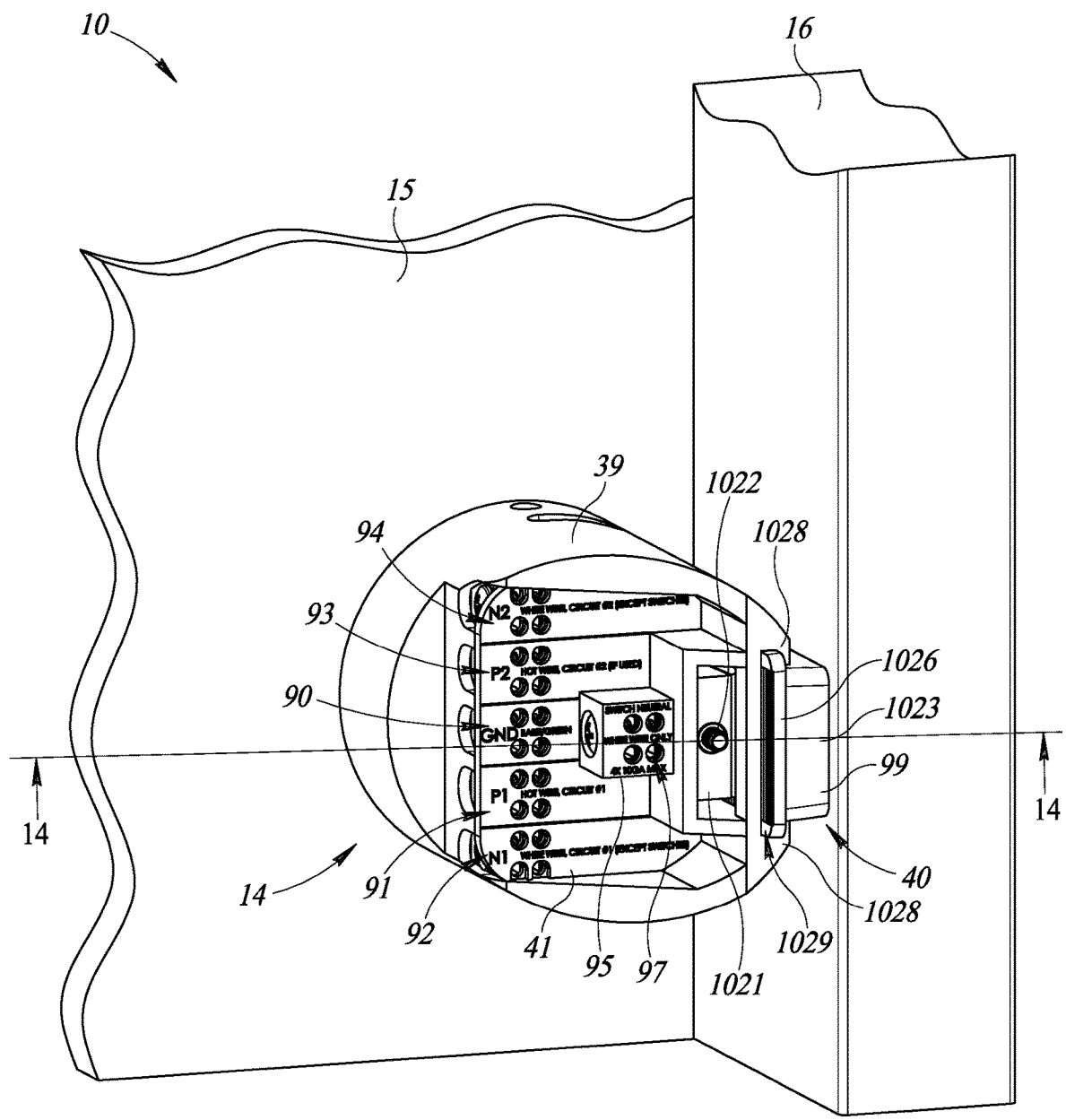
FIG. 1 is a rear, inverted isometric view of a universal power interface system, according to one example implementation.
Figure 2:
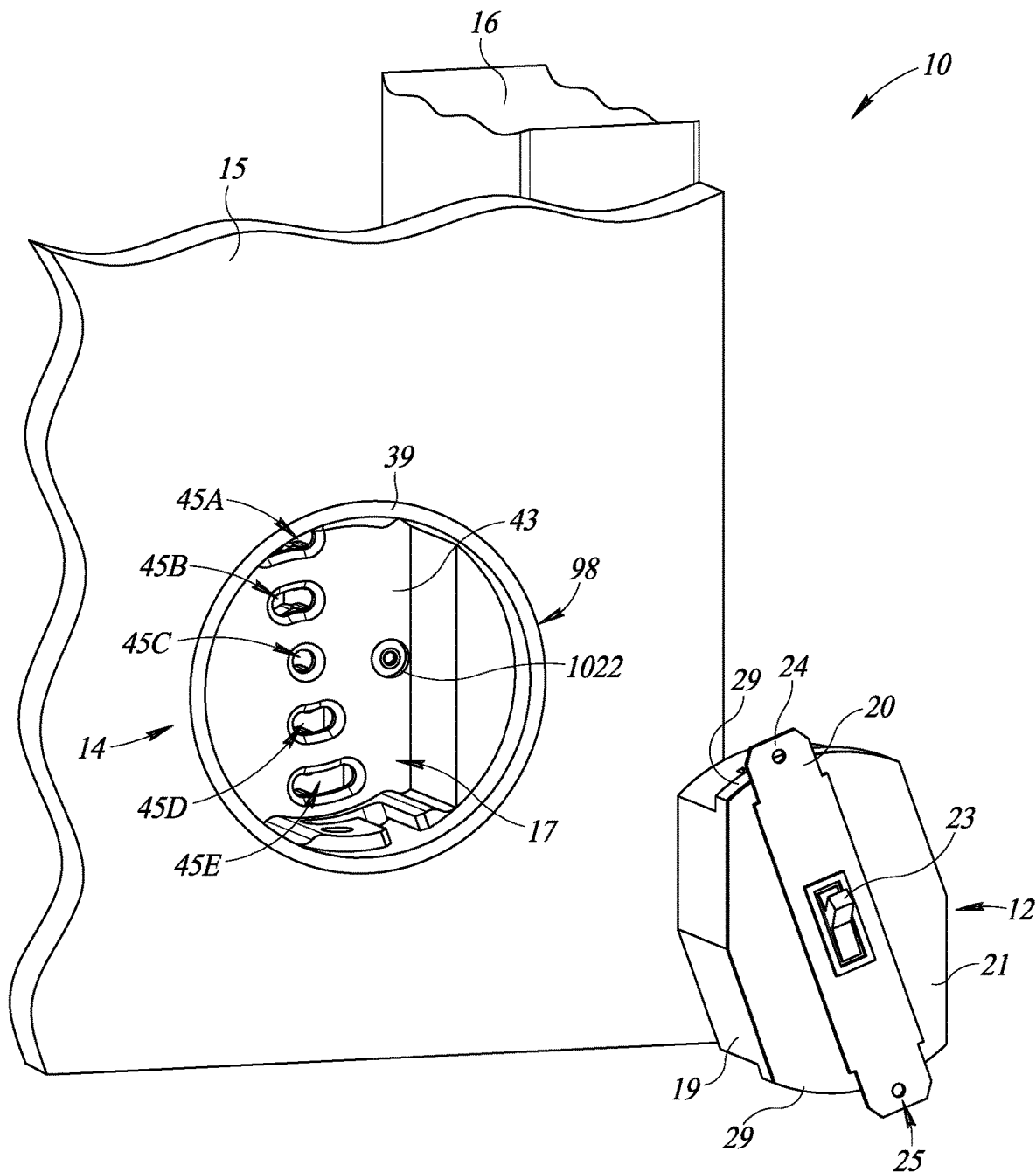
FIG. 2 is a front isometric view of the universal power interface system of FIG. 1 illustrating an uninstalled or pre-installed configuration of an electrical device module, according to one example implementation.
Figure 3:
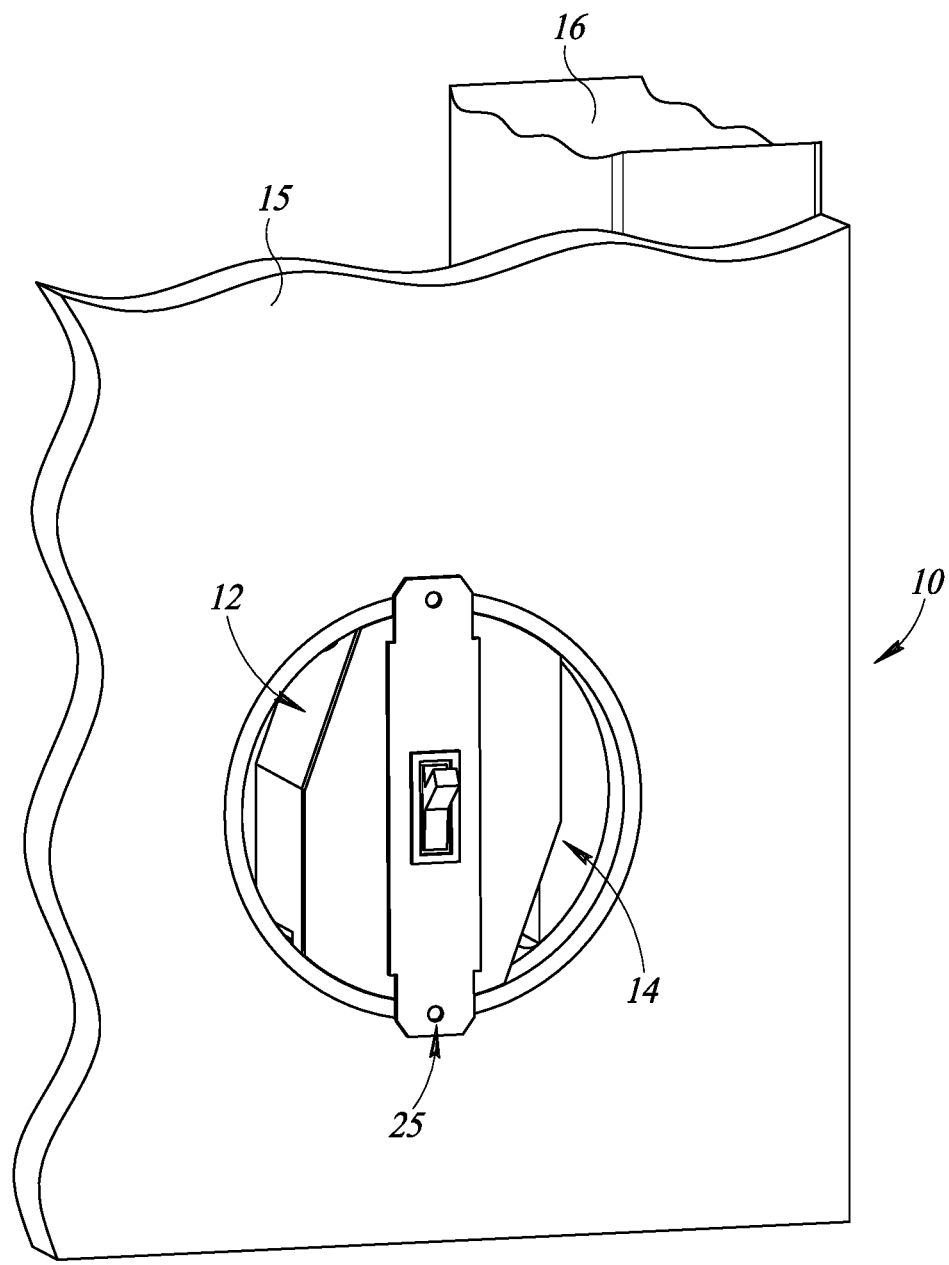
FIG. 3 is a front isometric view of the universal power interface system of FIG. 1 illustrating an installed configuration of an electrical device module, according to one example implementation.

FIGS. 1 through 3 illustrate a universal power interface system 10, according to one example implementation. The universal power interface system 10 includes an electrical device module 12 removably coupleable to a universal power interface device 14. As illustrated in FIG. 1, which illustrates a rear perspective view from an interior space behind a wall 15, the universal power interface device 14 can be coupled to a stud 16 and the wall 15. More generally, the universal power interface device 14 is configured to be coupleable to various building structures, such as walls, e.g., wall 15, studs, e.g., stud 16, ceilings, supporting structures, such as beams, etc. As illustrated in FIG. 1, various components of the universal power interface device 14 are generally hidden from view via the wall 15, which thus improves aesthetics, as various components, such as wiring, fasteners, etc., are not visible from building structure space that is commonly accessible by residents or visitors.

As illustrated in FIG. 2, which is a front isometric view of the universal power interface system 10, a receptacle region 17 of the universal power interface device 14 is visible from a front side of the wall 15 and is sized and shaped to removably, coupleably receive the electrical device module 12. The electrical device module 12 can comprise of a wide variety of electrical devices, such as, for example, light switches, ceiling fans, power outlets, light fixtures, etc. For example, the electrical device module 12 illustrated in FIG. 2 includes a light switch 20 coupled thereto. The electrical device module 12 is generally configured to be rotatably coupled to the universal power interface device 14 in an easy, simplified manner. For example, a user can insert the electrical device module 12 in the receptacle region 17 and rotate the electrical device module 12 to couple to the universal power interface device 14 as illustrated in FIG. 3. The user can uninstall the electrical device module 12 by rotating the electrical device module 12 and removing the electrical device module 12 from the receptacle region 17, as described in more detail below. Although not illustrated, conventional outer cover plates that surround the light switch 20 may be coupled to the electrical device module 12 upon coupling of the electrical device module 12 to the universal power interface device 14.

As described above, the electrical device module 12 can take a wide variety of forms. FIGS. 4A-4D illustrate the electrical device module 12 of FIGS. 1 through 3 in more detail, and FIGS. 5A-8B illustrate other exemplary electrical device modules, as will be described in more detail below.

With reference to FIGS. 4A-4D, and continued reference to FIGS. 1 through 3, the electrical device module 12 includes an outer housing 19 that is sized and shaped to be removably coupleably received in the receptacle region 17. The outer housing 19 is generally hollow to receive various components, including components of the light switch 20, wiring, fastening components, etc. In some implementations, an outer cover 21 can be coupled to the outer housing 19. The outer cover 21 may include a recess 22 that can be sized and shaped to having a similar profile as a profile of the light switch 20, which can provide access to an internal space of the outer housing 19 to receive various components, such as wiring, fastening, etc. In some implementations, the light switch 20 can be rigidly coupled to the outer cover 21 via welding, or removably coupled to the outer cover 21 via fastening, press-fitting, or other attaching structures. In some implementations, the outer cover 21 can be integrally formed with the light switch 20, which integrally formed component can be coupled to the outer housing 19. As described above, in general, an outer cover plate can be coupled to the outer cover 21 upon coupling of the electrical device module 12 to the universal power interface device 14.

Thus, such an outer cover plate may surround the light switch 20 so as to overlie the outer cover 21.

Although one implementation of a light switch 20 is illustrated in FIGS. 2-4B and 15A-15C as comprising a toggle light switch 23, other light switch designs, shapes, and sizes are within the scope of the disclosed subject matter. For example, the light switch 20 can comprise a rocker style switch, a dimmer light design, a square button design, a touch button design, etc. In some implementations, as illustrated in FIGS. 2-4B and 15A-15C, the light switch 20 may optionally include an outer cover plate mounting bracket 24. The outer cover plate mounting bracket 24 may optionally include one or more mount apertures 25 for coupling the light switch 20 to the outer cover plate with fasteners.

Figure 4A:
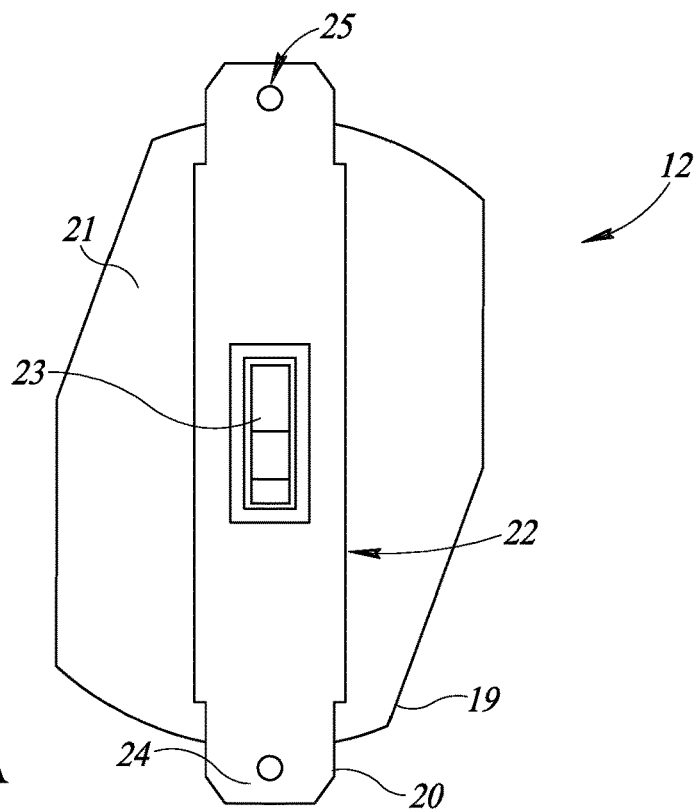
FIG. 4A is a front elevational view of the electrical device module of the universal power interface system of FIG. 1, according to one example implementation.
Figure 4B:
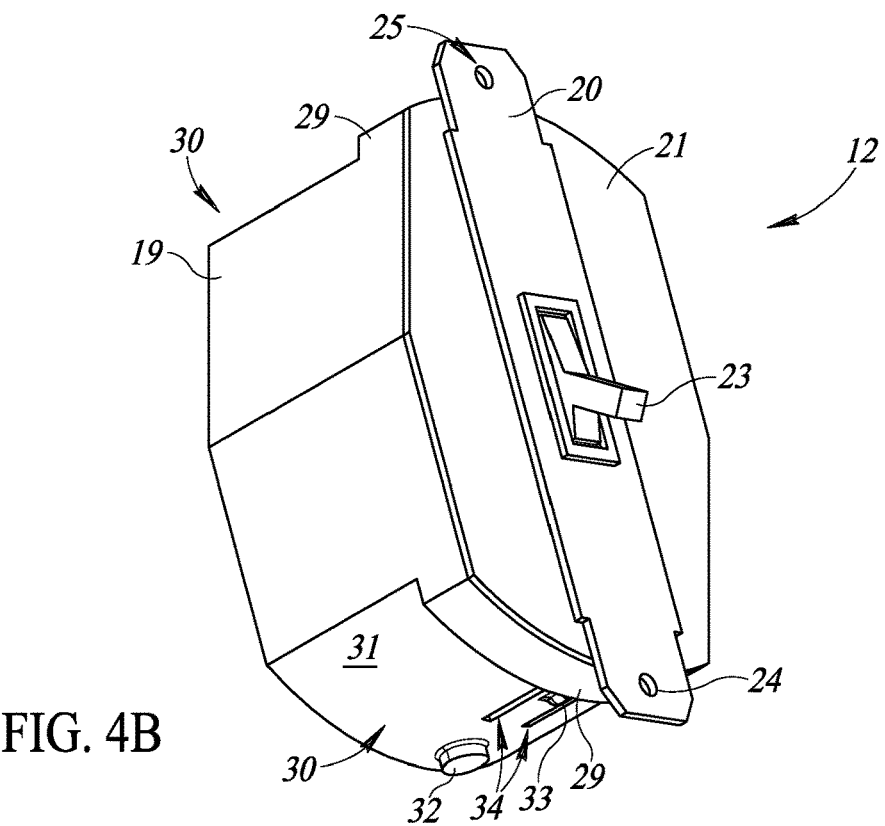
FIG. 4B is a skewed isometric view of an electrical device module of FIG. 4A.
Figure 4C:
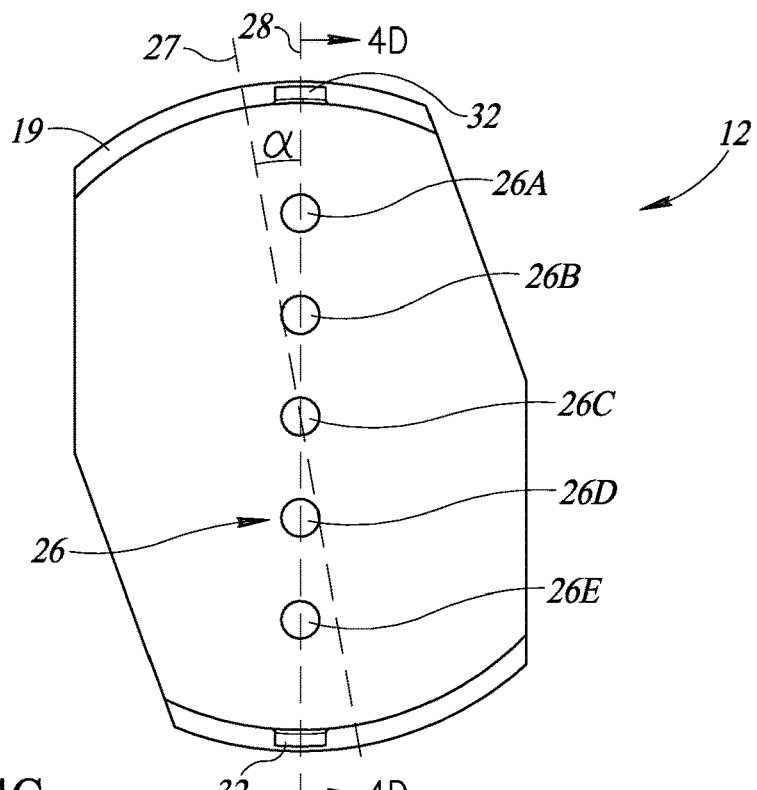
FIG. 4C is a rotated rear elevational view of the electrical device module of FIG. 4A.
Figure 4D:
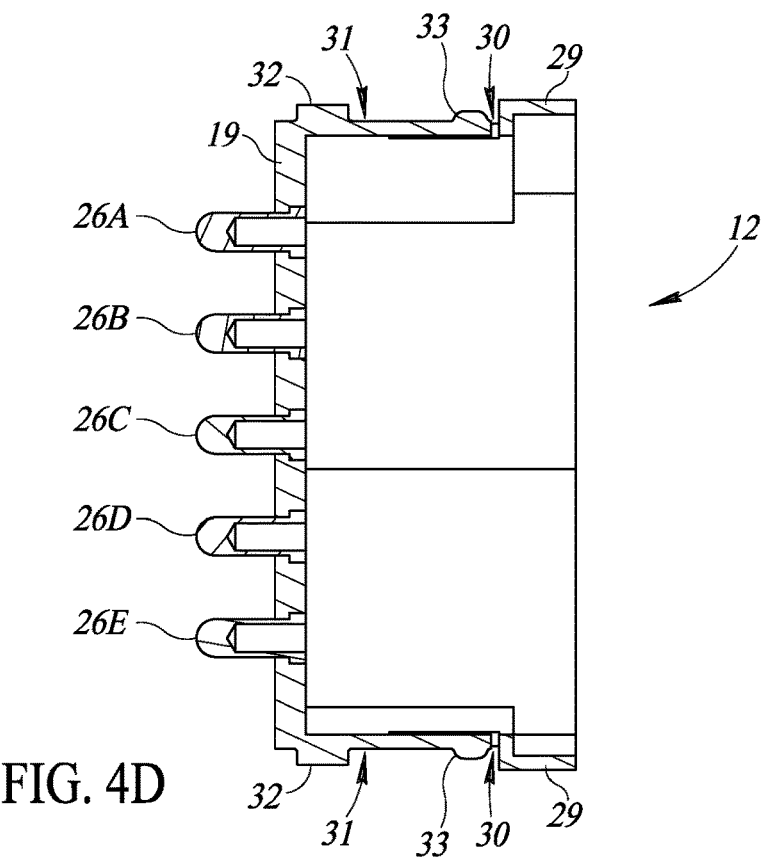
FIG. 4D is a cross-sectional view of the electrical device module of FIG. 4A, taken along lines 4D-4D.

As illustrated in more detail in FIGS. 4C-4D, where the light switch 23, the outer cover plate mounting bracket 24, and the outer cover 21 have been removed for clarity of illustration and description, the electrical device module 12 includes five contact pins 26A, 26B, 26C, 26D, and 26E (sometimes collectively referred to by reference numeral 26) that protrude outwardly from the outer housing 19. One or more of the contact pins 26 may be hard-wired to the light switch 20. For example, one or both of contact pin 26B and/or contact pin 26D may be hard-wired to a hot wire (not shown for clarity of illustration and description) of the light switch 20. For example, if the light switch 20 is a three-way or a four-way switch, both contact pins 26B, 26D can be hard-wired to hot wires of the light switch 20. Contact pin 26C may be hard-wired to a ground wire of the light switch 20. In some implementations, if the light switch 20 does not have neutral wire(s), contact pins 26A and 26E may remain blank. In general, however, the five contact pin 26 arrangement provides for the capability of the electrical device module 12 being operably symmetric. For example, the electrical device module 12 is configured to be modular, such that a wide variety of light wiring schemes are supported. Thus, when a three-way or four way light switch is to be installed, a user can install the electrical device module 12 at a 0 degree configuration or rotate the electrical device module 12 180 degrees and install the electrical device module 12, such that, for example, contact pin 26A will be in the position of contact pin 26E in the configuration illustrated in FIGS. 4C, 4D, and vice versa. Similarly, the position of the other contact pins, e.g., contact pins 26B and 26D, will be switched. The symmetric operability of the electrical device module 12 facilitates flexibility in installing the electrical device module 12.

As illustrated in FIGS. 4C-4D in detail, the contact pins 26 are arranged at an angular orientation relative to a central vertical axis 27 of the electrical device module 12. For example, the contact pins 26 are positioned along a connector axis line 28 that is angularly spaced apart from the central vertical axis 27 at an angle of α. In some implementations, angle α can be approximately 20 degrees. Other angular orientations, however, are within the scope of the disclosed subject matter. For example, in some embodiments, the angle α can range from between 5 to 40 degrees. In general, as described in more detail below, the angular orientation of the connector axis line 28 facilitates rotatable coupling of the electrical device module 12 with the universal power interface device 14, sometimes referred to herein as twist-lock coupling.

With continued reference to FIGS. 2-4D, the outer housing 19 has, in some implementations, outer rim portions 29 that are defined at least, in part, by corresponding recesses 30 in a body of the outer housing 19. The recesses 30 in the body of the outer housing 19 define connection surfaces 31. Each connection surface 31 includes a connecting tab 32 that protrudes outwardly therefrom. Adjacent to the connecting tab 32, each connection surface 31 includes a locking tab 33 protruding outwardly therefrom. Each connection surface 31 includes a pair of slits 34 that are spaced apart relative to the locking tab 33. The pair of slits 34 are sized and shaped to provide resiliency to the connection surface 31 such that portions of the outer housing 19 can deflect or elastically deform during coupling of the electrical device module 12 with the universal power interface device 14. As illustrated in FIGS. 4A-4D, the locking tab 33 and the connecting tab 32 are oriented along the connector axis line 28.

Figure 5A:
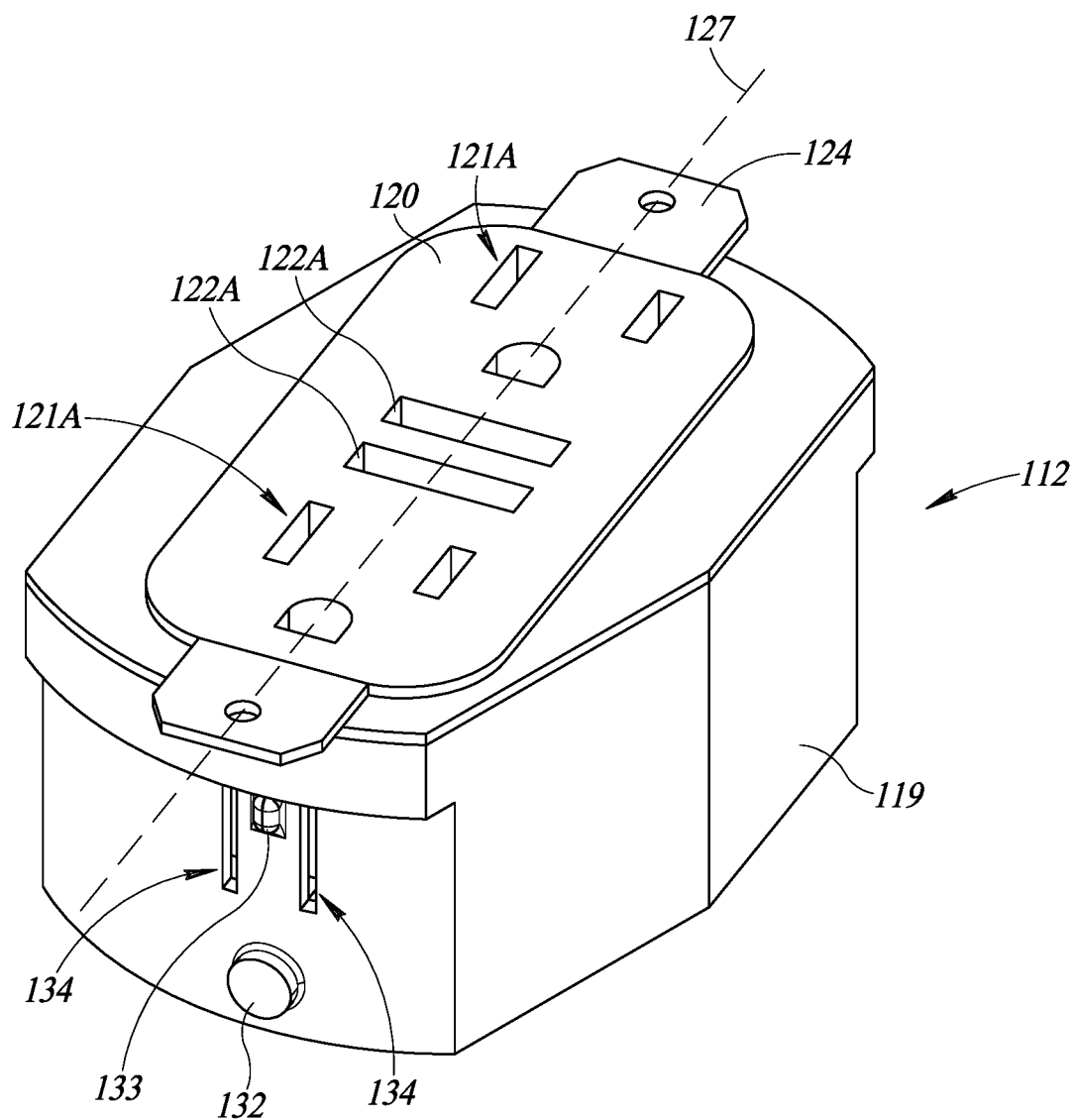
FIG. 5A is a top skewed isometric view of an electrical device module, according to another example implementation.
Figure 5B:
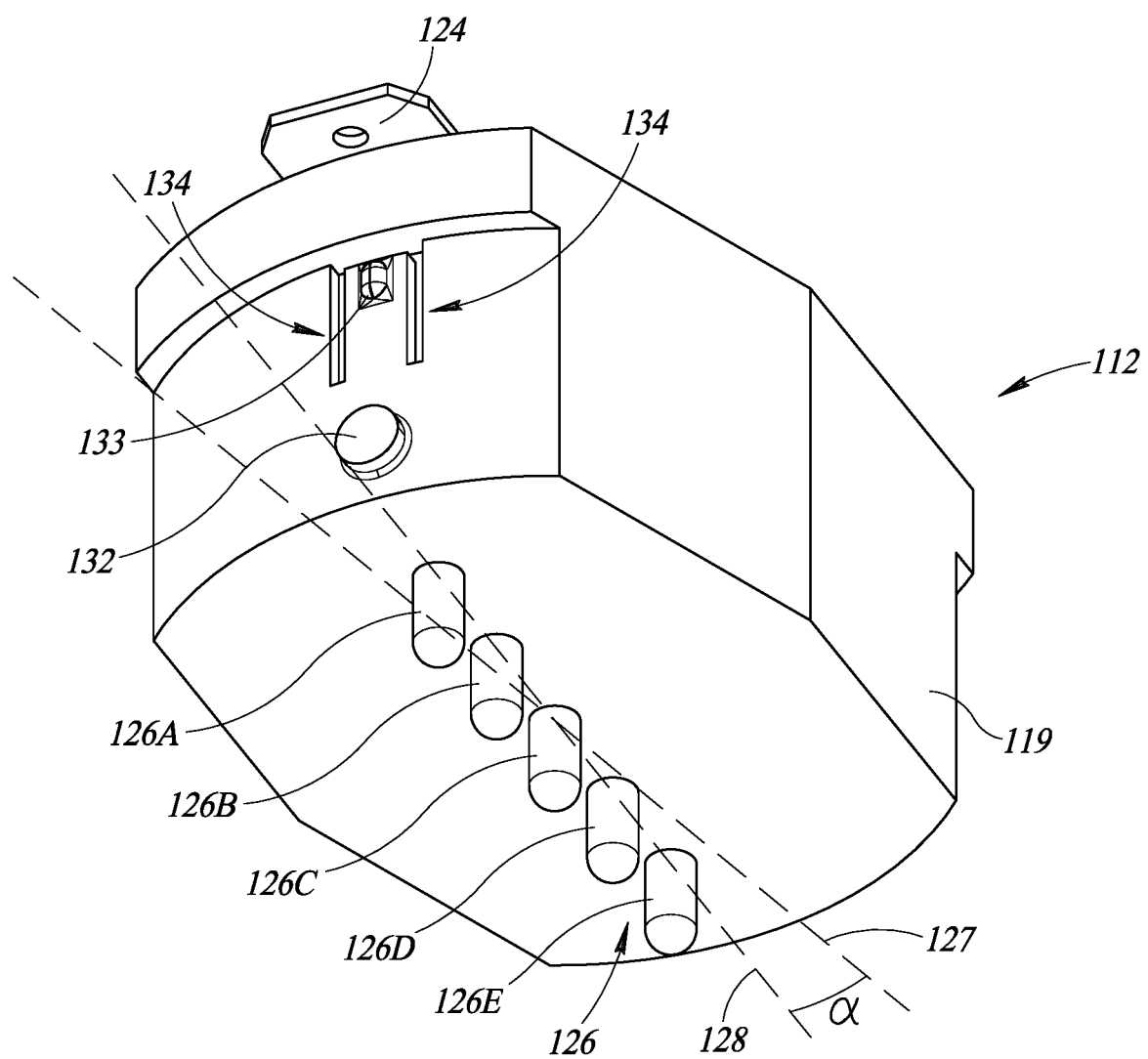
FIG. 5B is a bottom skewed isometric view of the electrical device module of FIG. 5A.

As described above, the electrical device module 12 can take a wide variety of forms. For example, FIGS. 5A to 5B illustrate an electrical device module 112, according to one example implementation, that includes a power outlet 120 coupled thereto. The power outlet 120 may also optionally include outer cover plate mounting brackets 124. Again, although one implementation of the power outlet 120 is illustrated in FIGS. 5A to 5B having a pair of power outlet sockets 121A and a pair of USB ports 122A, other implementations of a power outlet 120 are within the scope of the disclosed subject matter. For example, in some implementations, the power outlet 120 may include one or more USB ports 122A, one or more power sockets 121A, or any combinations thereof. In some implementations, the power sockets 121A may take the form suitable for 220V/240V power delivery, 110V/120V power delivery, etc. Again, as described above, in general, an outer cover plate can be coupled to the electrical device module 112, which surrounds the power outlet 120 upon coupling of the electrical device module 112 to the universal power interface device.

As illustrated in FIG. 5B in detail, the electrical device module 112 is generally similar to the electrical device module 12. For example, the electrical device module 112 includes five contact pins 126A, 126B, 126C, 126D, and 126E. One or both of contact pins 126A and 126E can be hard-wired to a neutral wire(s) (not shown for the sake of clarity of illustration and description) of the power outlet 120. One or both contact pins 126B and 126D can be hard-wired to hot wire(s) of the power outlet 120. Contact pin 126C can be hard-wired to a ground wire of the power outlet 120. As described above, the electrical device module 112 is configured to be symmetrically operable. For example, in some implementations, if the power outlet 120 is located in a middle of a run outlet relative to an electrical wiring scheme of a building structure, such an outlet can include a pair of neutral wires and a pair of hot wires in the power outlet 120. Having the specific five contact pin 126 symmetric arrangement of the implementation of the electrical device module 112 allows for a 0 degree and a 180 degree configuration, where the positions of contact pin 126A can be switched with contact pin 126E, and contact pin 126B with contact pin 126D during installation.

The symmetrical arrangement of the contact pins 126 can be advantageous if, for example, in some implementations, the power outlet 120 includes one of each hot wire, ground wire, and neutral wire. In such implementations, not only does the symmetric arrangement allow for both a 0 degree and 180 degree configuration, but the specific symmetric five contact pin 126 arrangement also allows for the flexibility of having another hot wire coupled to one of contact pins 126B, 126E and another pair of neutral wires coupled to contact pins 126A, 126D. In this manner, the electrical device module 112 can be capable of independently delivering power from each power socket, e.g., 121A. Further, in some implementations, the power outlet 120 can support a 220V/240V power delivery configuration in a symmetric arrangement. For example, if the power outlet 120 is configured as a 220V/240V power delivery configuration, such a power outlet 120 may include a pair of hot wires that can be hard-wired to contact pins 126B, 126D, a ground wire that can be hard-wired to contact pin 126C, and a neutral wire that can be hard-wired to either the contact pin 126A or contact pin 126E. Again, the symmetric arrangement of the contact pins 126 can facilitate rotating the electrical device module 112 between 0 and 180 degree configurations and coupling the electrical device module 112 with the universal power interface device, which is configured to facilitate the symmetric coupling, as described in more detail below.

The electrical device module 112 also includes an outer housing 119, which is generally similar to the outer housing 19 illustrated in FIGS. 2-4D. Thus, the outer housing 119 also includes the contact pins 126 that are at an angular orientation relative to a central vertical axis 127 of the electrical device module 112. For example, the contact pins 126 are positioned along a connector axis line 128 that is angularly spaced apart from the central vertical axis 127 at an angle of α. Moreover, the outer housing 119 also includes a pair of locking tabs 133, pairs of slits 134 spaced apart relative to the corresponding locking tabs 133, and a pair of connecting tabs 132. Again, the connecting tabs 132 and the locking tabs 133 are generally aligned with the connector axis 128.

Figure 6A:
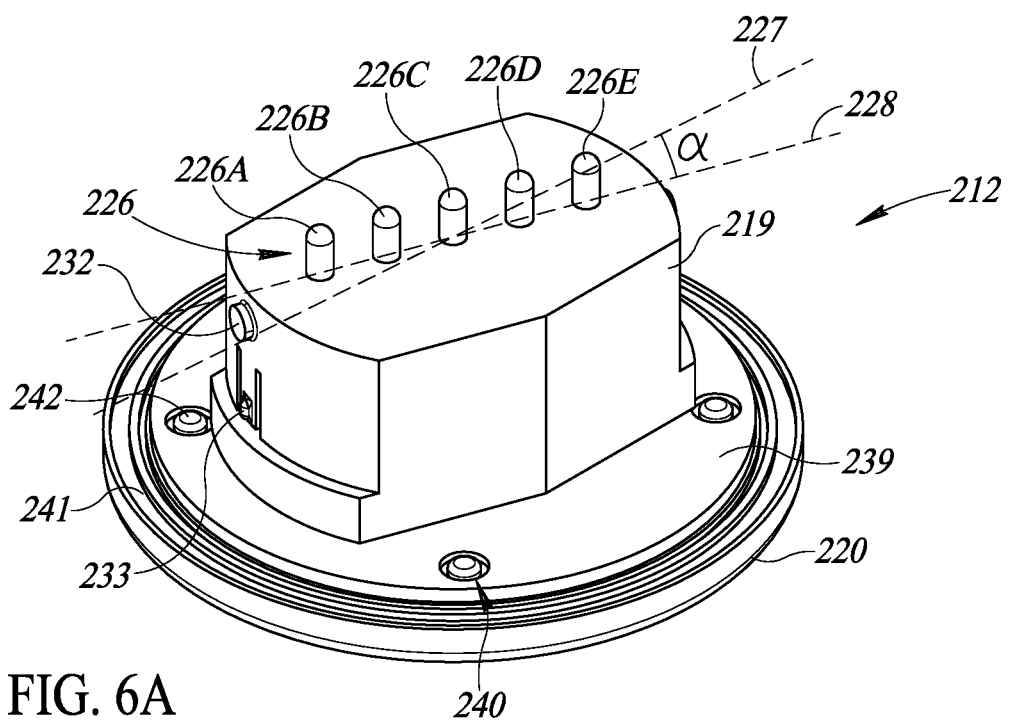
FIG. 6A is a bottom skewed isometric view of an electrical device module, according to another example implementation.
Figure 6B:
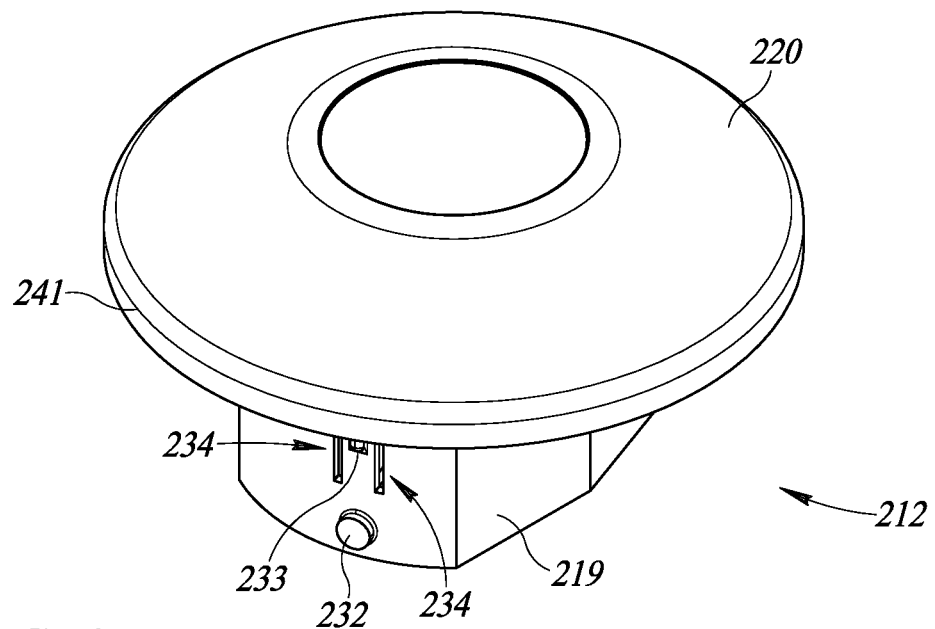
FIG. 6B is a top skewed isometric view of the electrical device module of FIG. 6A.

FIGS. 6A and 6B illustrate an electrical device module 212, according to one example implementation, that includes a lighting fixture 220 coupled thereto. Again, the lighting fixture 220 can take a wide variety of forms and shapes. The electrical device module 212 is generally similar to the electrical device modules 12, 112, but provides certain variations. For example, the electrical device module 212 includes a mounting plate 239 that extends circumferentially outwardly around an outer housing 219 of the electrical device module 212. The mounting plate 239 is generally sized and shaped to be coupleable to the lighting fixture 220. For example, in some implementations, the mounting plate 239 includes a plurality of fixture apertures 240. The fixture apertures 240 are sized and shaped to be removably coupled to a housing body 241 of the lighting fixture 220 via fasteners 242.

As illustrated in FIGS. 6A and 6B, the electrical device module 212 also includes five contact pins 226A, 226B, 226C, 226D, and 226E. Again as described above, such an arrangement of contact pins 226 allows for a symmetrical arrangement having the capability of a 0 degree and a 180 degree installation. For example, in some implementations, one or two hot wires of the lighting fixture 220 can be hard-wired to any one of, or both of, contact pins 226B, 226D. One or two neutral wires of the lighting fixture 220 can be hard-wired to any one of, or both of, contact pins 226A, 226E. A ground wire can be hard-wired to contact pin 226C. Again, as described above, the universal power interface device also includes a symmetric connector receiving arrangement, which facilitates the electrical device module 212 to be coupled to the universal power interface device in a 0 degree or a 180 degree configuration.

In addition, generally similar to the outer housings 19, 119, the outer housing 219 also includes the contact pins 226 that are at an angular orientation relative to a central vertical axis 227 of the electrical device module 212. For example, the contact pins 226 are positioned along a connector axis line 228 that is angularly spaced apart from the central vertical axis 227 at an angle of α. Moreover, the outer housing 219 also includes a pair of locking tabs 233, pairs of slits 234 spaced apart relative to the corresponding locking tabs 233, and a pair of connecting tabs 232. Again, the connecting tabs 232 and the locking tabs 233 are generally aligned with the connector axis 228.

Figure 7:
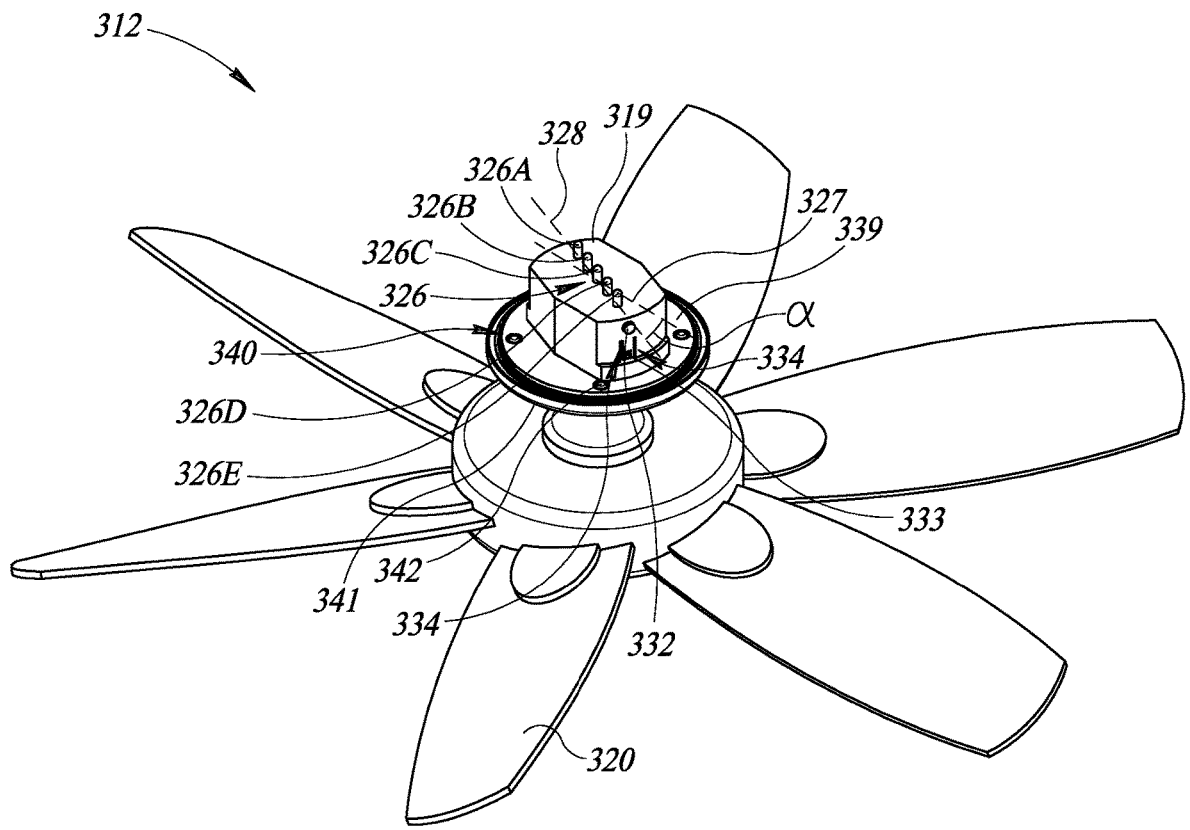
FIG. 7 is a bottom skewed isometric view of an electrical device module, according to another example implementation.

FIG. 7 illustrates an electrical device module 312, according to one example implementation, that includes a ceiling fan 320 coupled thereto. The electrical device module 312 is generally similar to the electrical device module 212 and includes a mounting plate 339 that extends circumferentially outwardly around an outer housing 319 of the electrical device module 312. The mounting plate 339 is generally sized and shaped to be coupleable to the ceiling fan 320. For example, in some implementations, the mounting plate 339 includes a plurality of fixture apertures 340. The fixture apertures 340 are sized and shaped to be removably coupled to a housing body 341 of the lighting fixture 320 via fasteners 342.

As illustrated in FIG. 7, the electrical device module 312 also includes five contact pins 326A, 326B, 326C, 326D, and 326E (collectively referred to sometimes as reference numeral 326). Again as described above, such an arrangement of contact pins 326 allows for a symmetrical arrangement having the capability of a 0 degree and a 180 degree installation. For example, in some implementations, one or two hot wires of the ceiling fan 320 can be hard-wired to any one of, or both of, contact pins 326B, 326D. One or two neutral wires of the ceiling fan 320 can be hard-wired to any one of, or both of, contact pins 326A, 326E. A ground wire can be hard-wired to contact pin 326C. Again, as described above, the universal power interface device also includes a symmetric connector receiving arrangement, which facilitates the electrical device module 312 to be coupled to the universal power interface device in a 0 degree or a 180 degree configuration.

In addition, generally similar to the outer housing 219, the outer housing 319 also includes the contact pins 326 that are at an angular orientation relative to a central vertical axis 327 of the electrical device module 312. For example, the contact pins 326 are positioned along a connector axis line 328 that is angularly spaced apart from the central vertical axis 329 at an angle of α. Moreover, the outer housing 319 also includes a pair of locking tabs 333, pairs of slits 334 spaced apart relative to the corresponding locking tabs 333, and a pair of connecting tabs 332. Again, the connecting tabs 332 and the locking tabs 333 are generally aligned with the connector axis 328.

Figure 8A:
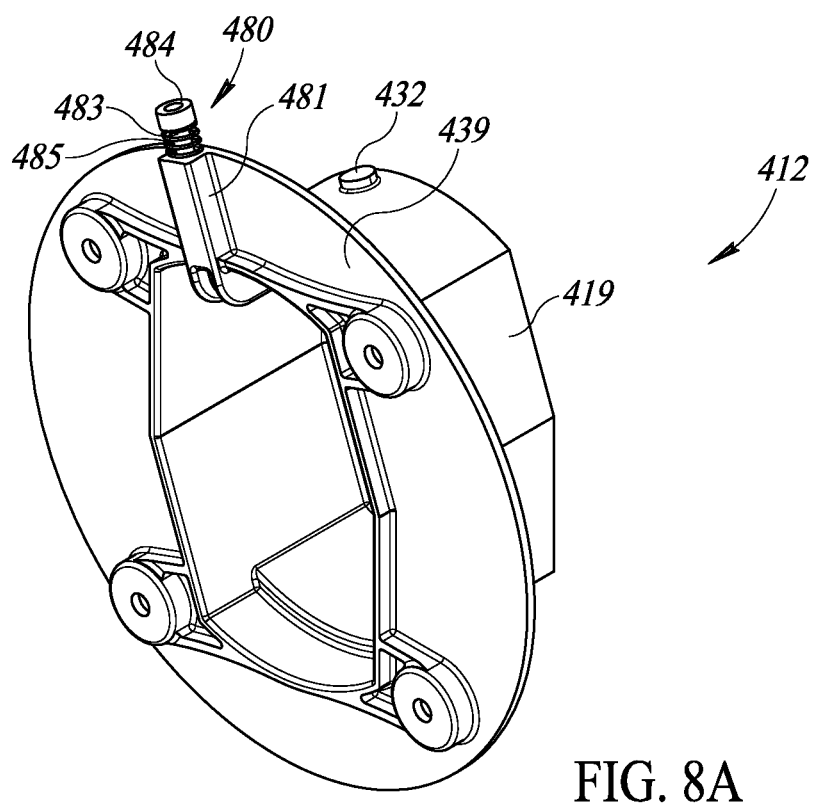
FIG. 8A is a top skewed isometric view of an electrical device module, according to another example implementation, with certain portions removed for clarity of description and illustration.
Figure 8B:
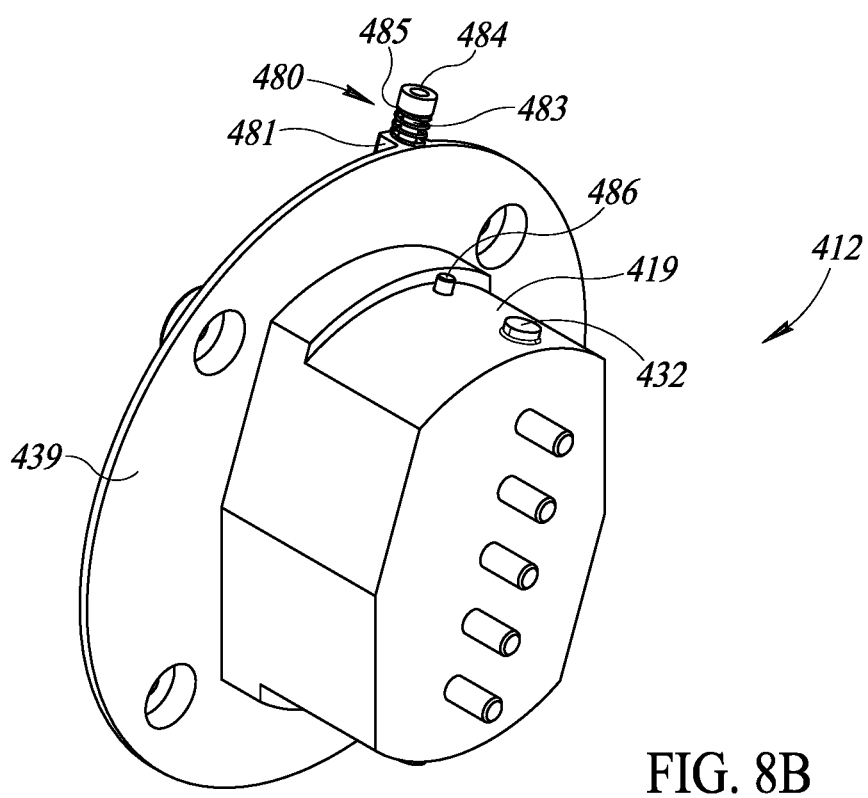
FIG. 8B is a side skewed isometric view of the electrical device module of FIG. 8A.

FIGS. 8A and 8B illustrate an electrical device module 412 according to another implementation. The electrical device module 412 is generally similar to the electrical device modules 212, 312, etc., but provides certain variations. For example, the electrical device module 412 includes a biasing mechanism 480. The biasing mechanism 480 includes an outer tube 481 that has a generally u-shaped structure that protrudes outwardly from a surface of a mounting plate 439 and extends to an outer housing 419 of the electrical device module 412. The outer tube 481 is generally hollow and includes a biasing shaft 483. One end 484 of the biasing shaft 483 protrudes out from the outer tube 481 with a biasing member 485, e.g., a spring, positioned between the end 484 of the biasing shaft 483 and a surface of the outer tube 481. Another end 486 of the biasing shaft 483 protrudes out from the outer housing 419. The biasing member 485 is sized and shaped to urge the end 484 of the biasing shaft 483 outwardly relative to the mounting plate 439. Thus, depressing the end 484 of the biasing shaft 483 causes the end 486 of the biasing shaft 483 to move inwardly relative to the outer housing 419.

As described above, in some implementations, various outer housings, e.g., outer housing 19, 119, 219, 319, etc. include a pair of locking tabs, e.g., locking tabs 33, 133, 233, 333, etc., pairs of slits, e.g., slits 34, 134, 234, 334, etc., and a pair of connecting tabs, e.g., connecting tabs 32, 132, 232, 332, etc. In the implementation illustrated in FIGS. 8A, 8B, the electrical device module 412 includes the biasing shaft 483 having the end 486 protrude outwardly from the outer housing 419 in lieu of the locking tabs and the adjacent slits, and also includes a connecting tab 432, which is generally similar to the other connecting tabs described herein.

As described above, the electrical device module 412 illustrated in FIGS. 8A, 8B can support a wide variety of electrical devices. For example, a light fixture, e.g., lighting fixture 220, can be coupled to the mounting plate 439 of the electrical device module 412. Similarly, a ceiling fan, e.g., ceiling 320, or any other electrical device can be removably coupled to the mounting plate 439 of the electrical device module 412. In some implementations, the biasing mechanism 480 may provide additional support capabilities to the electrical device module 412, for example, when the electrical device module 412 is sized and shaped to support electrical devices coupled to ceiling structures.

Figure 9:
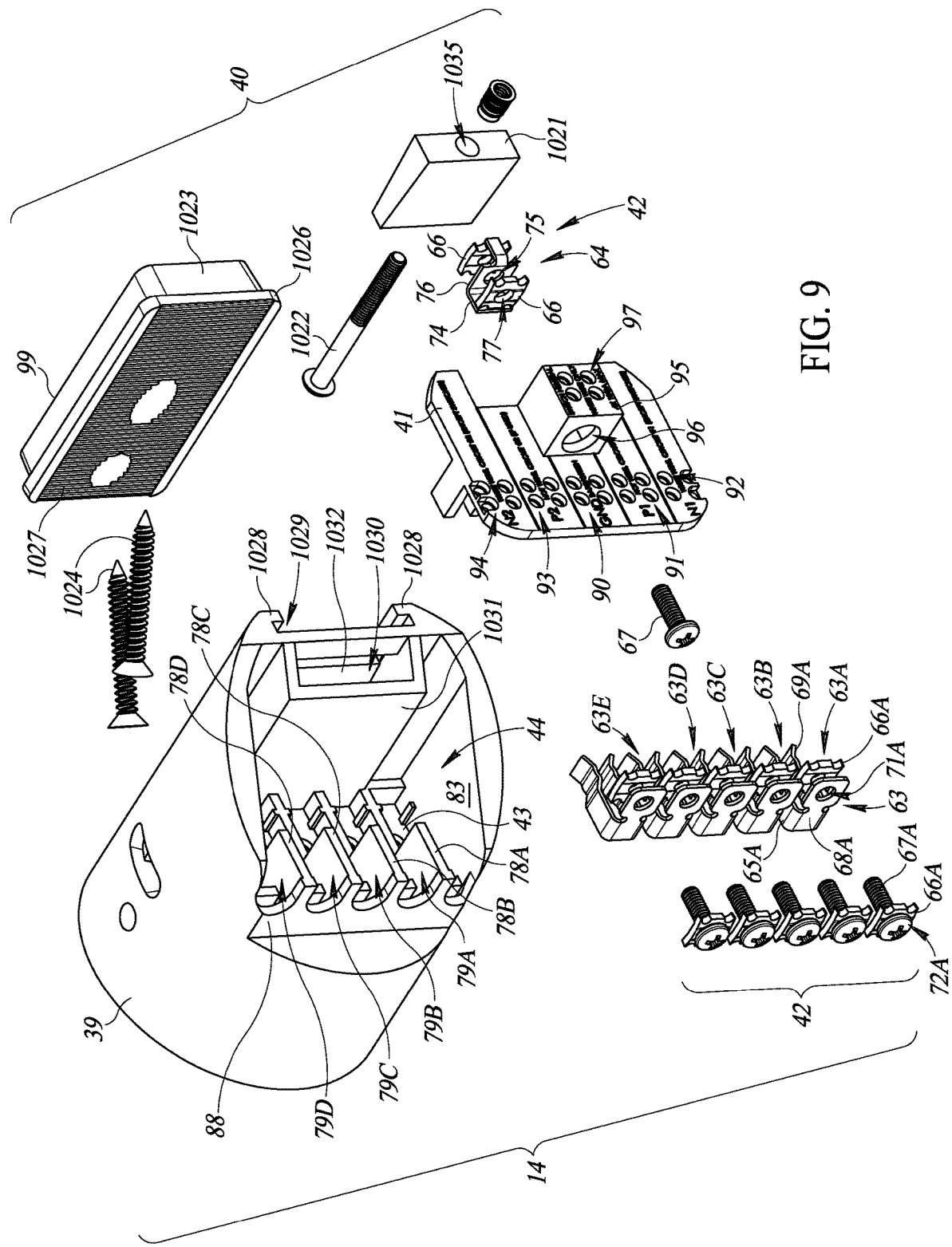
FIG. 9 is an exploded view of a universal power interface device of the universal power interface system of FIG. 1, according to one example implementation.
Figure 9A:
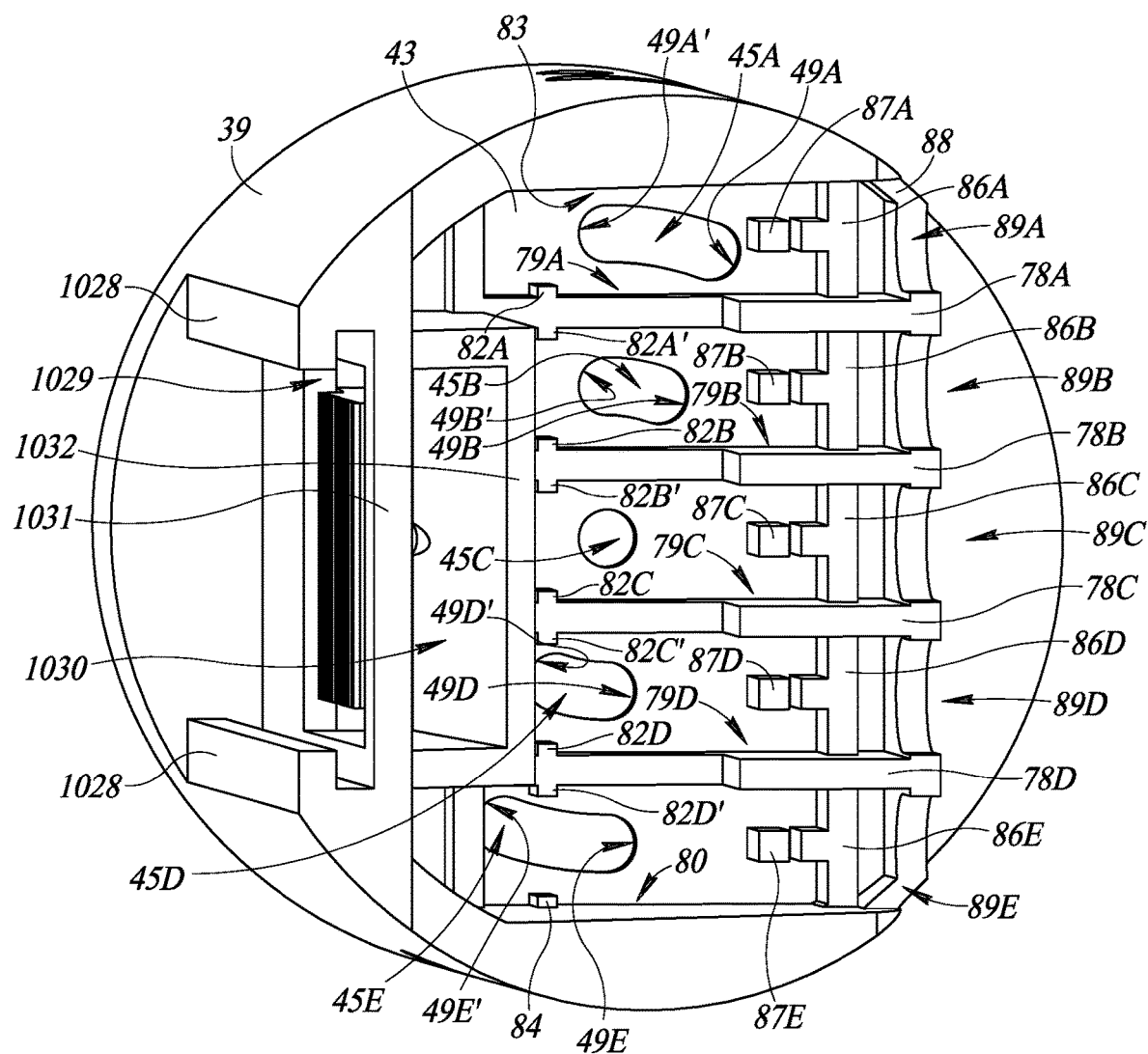
FIG. 9A is a skewed isometric view of the universal power interface device of the universal power interface system of FIG. 1, with certain components removed for clarity of description and illustration.
Figure 10:
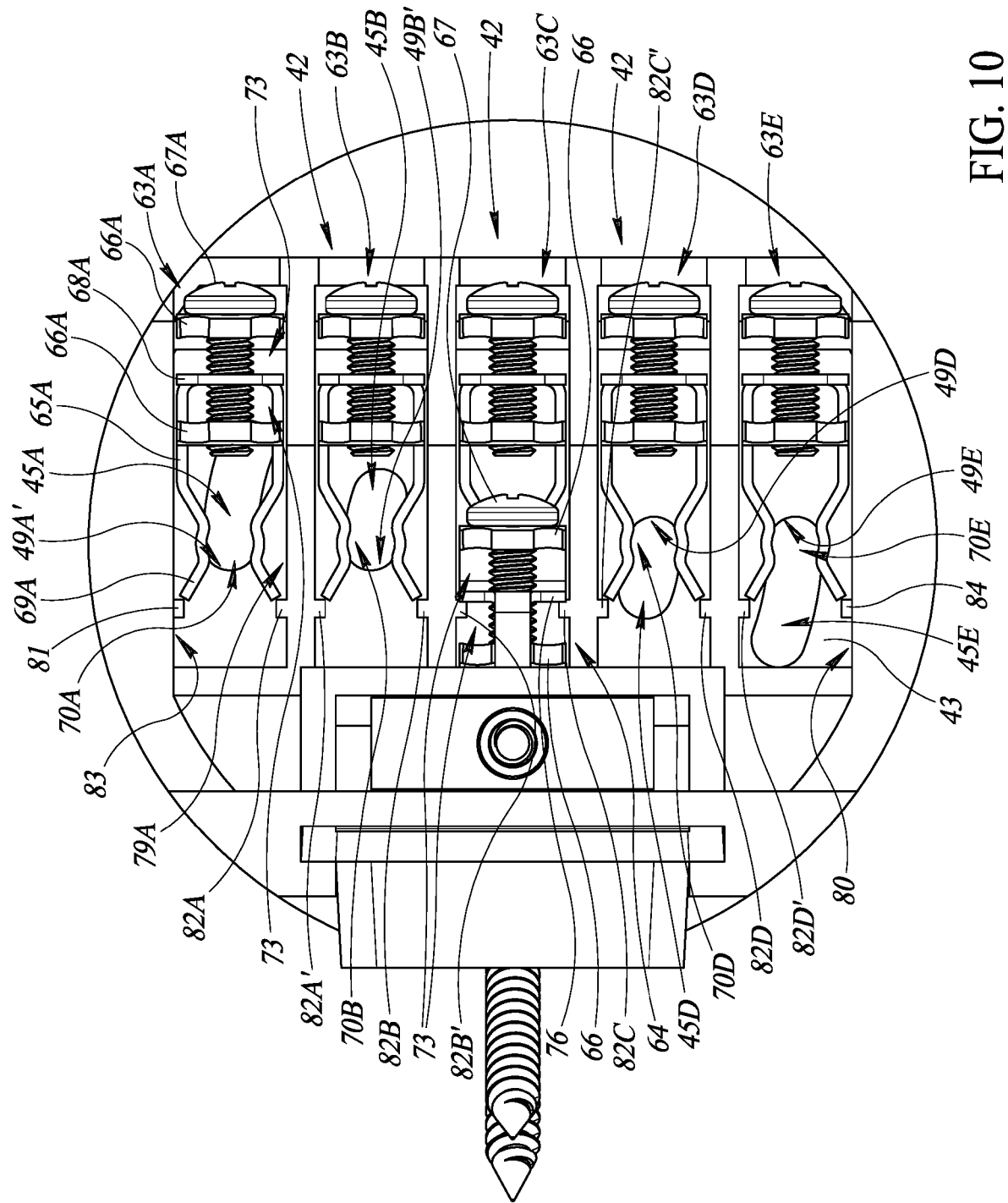
FIG. 10 is a rear elevational view of the universal power interface system of FIG. 1, with certain components removed for clarity of description and illustration.
Figure 11:
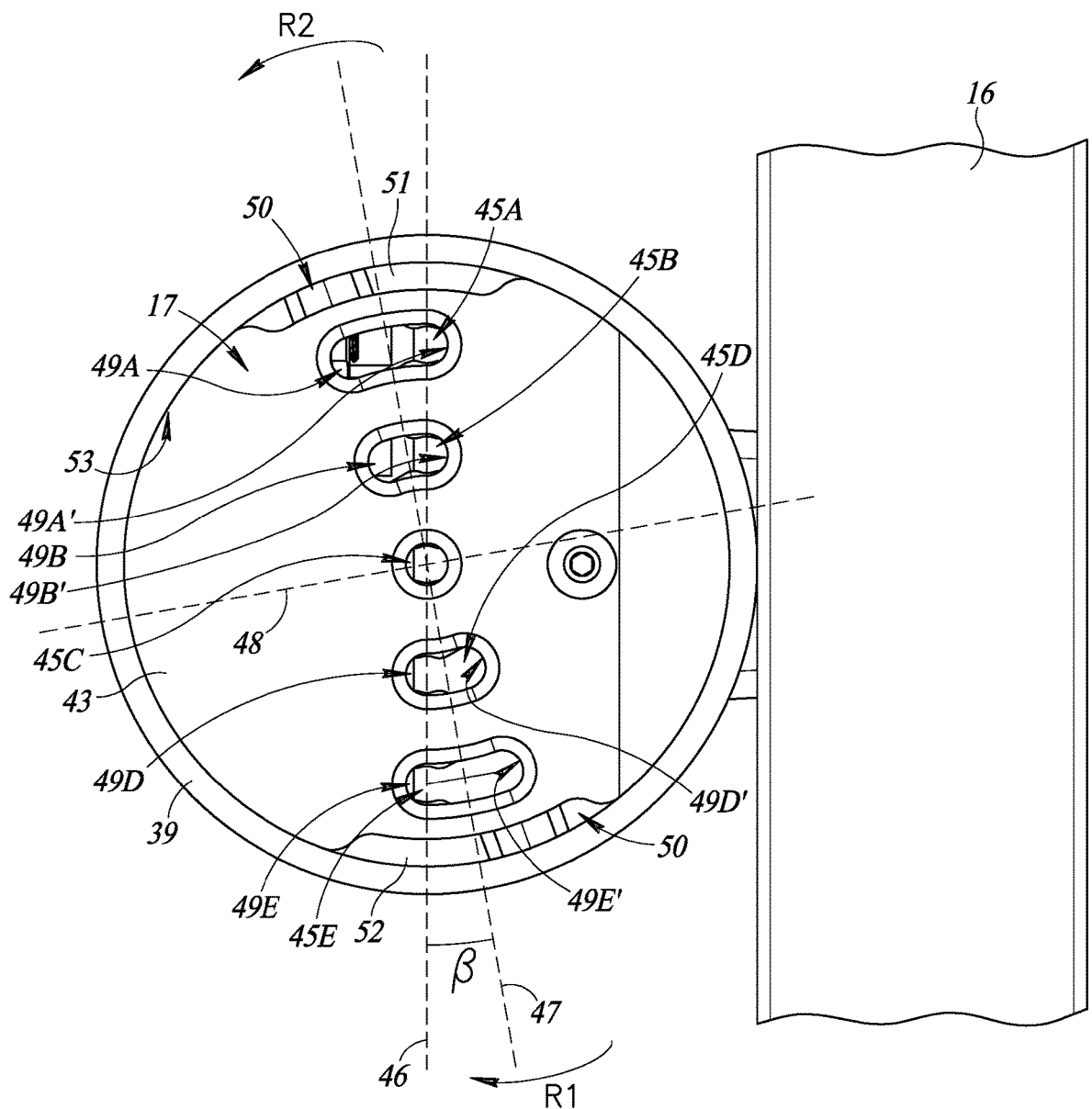
FIG. 11 is a front elevational view of the universal power interface system of FIG. 1, with certain components removed for clarity of description and illustration.
Figure 12:
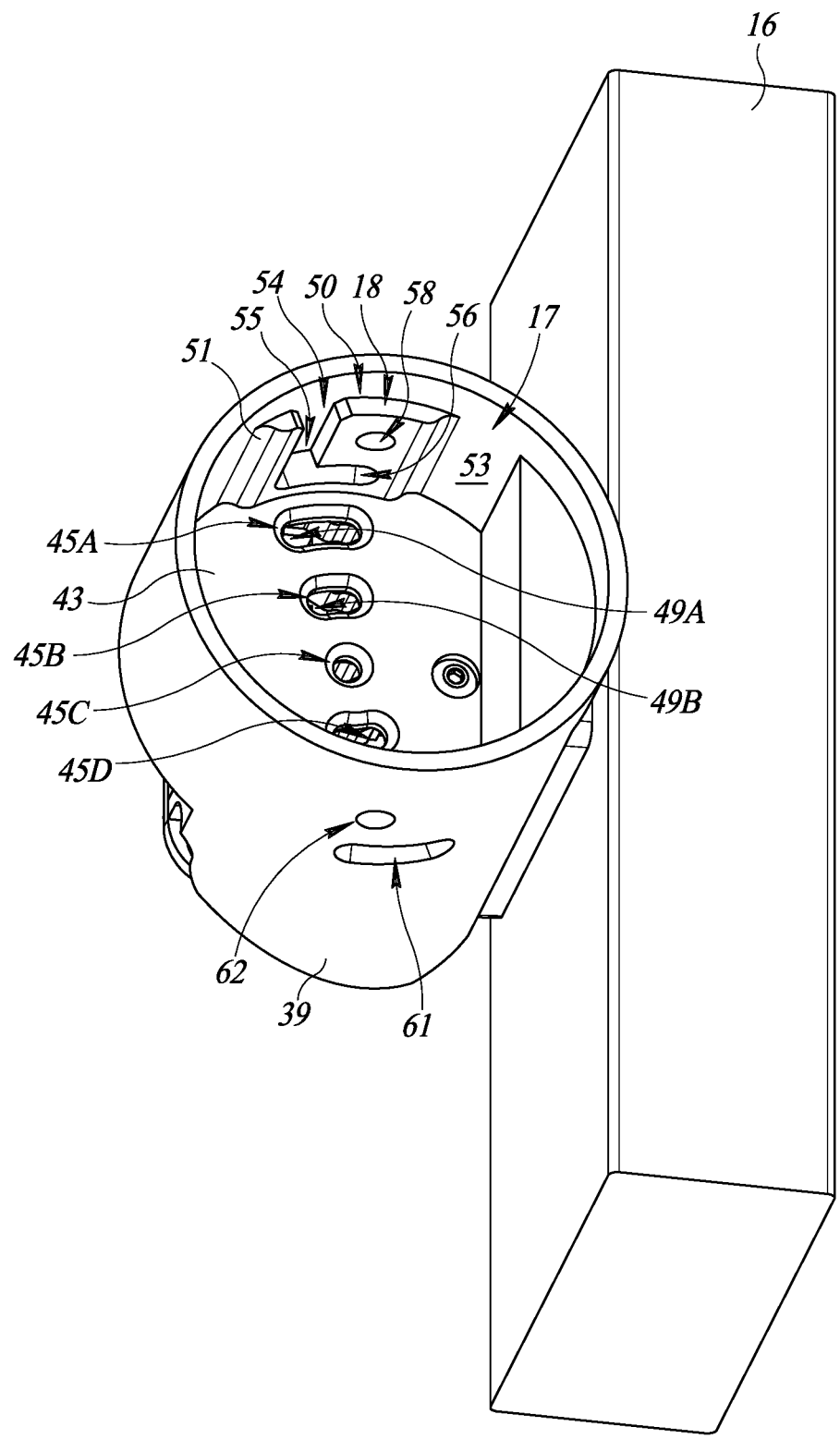
FIG. 12 is a skewed top isometric view of the universal power interface system of FIG. 1, with certain components removed for clarity of description and illustration.
Figure 13:
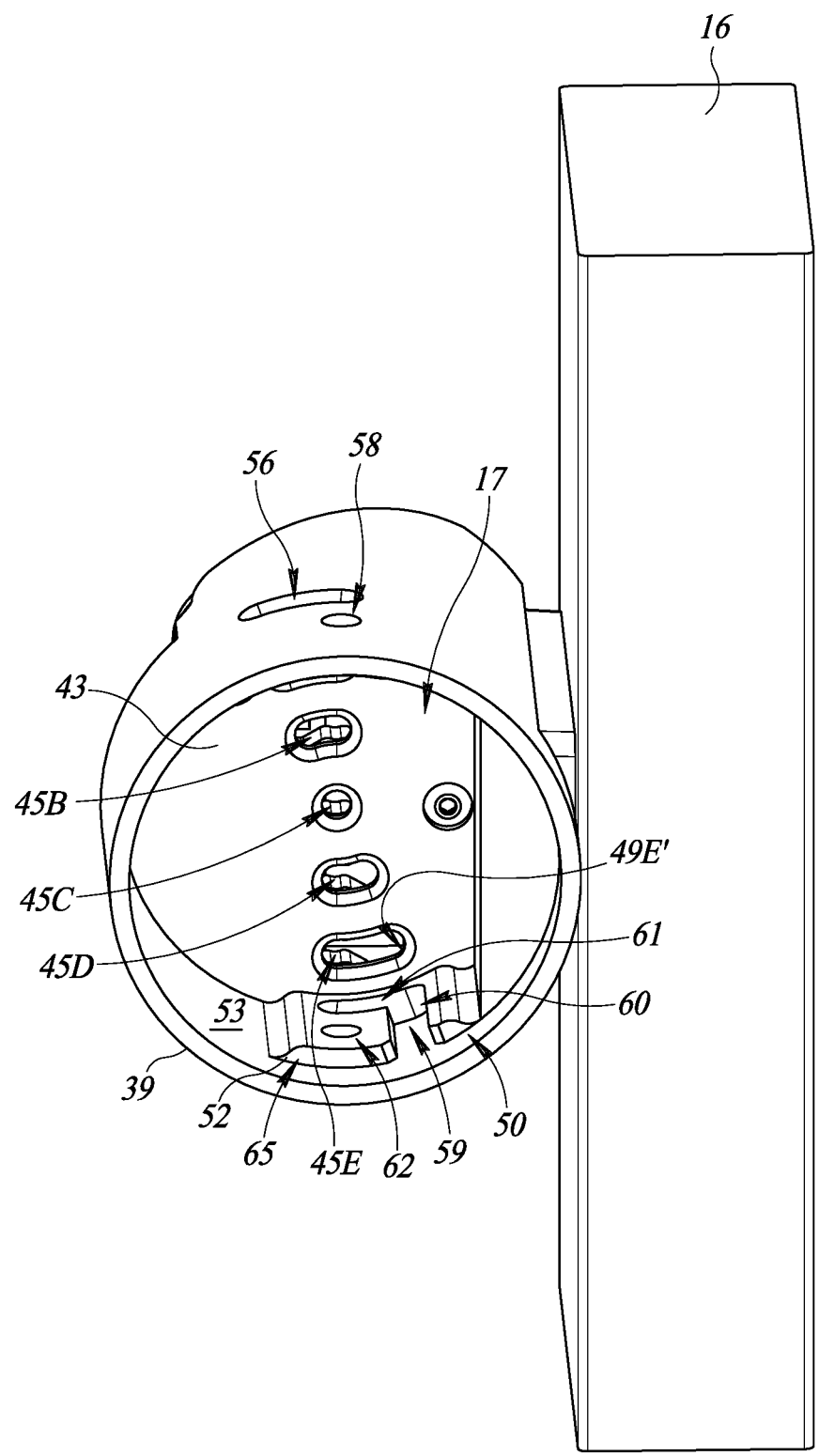
FIG. 13 is a skewed bottom isometric view of the universal power interface system of FIG. 1, with certain components removed for clarity of description and illustration.
Figure 14:
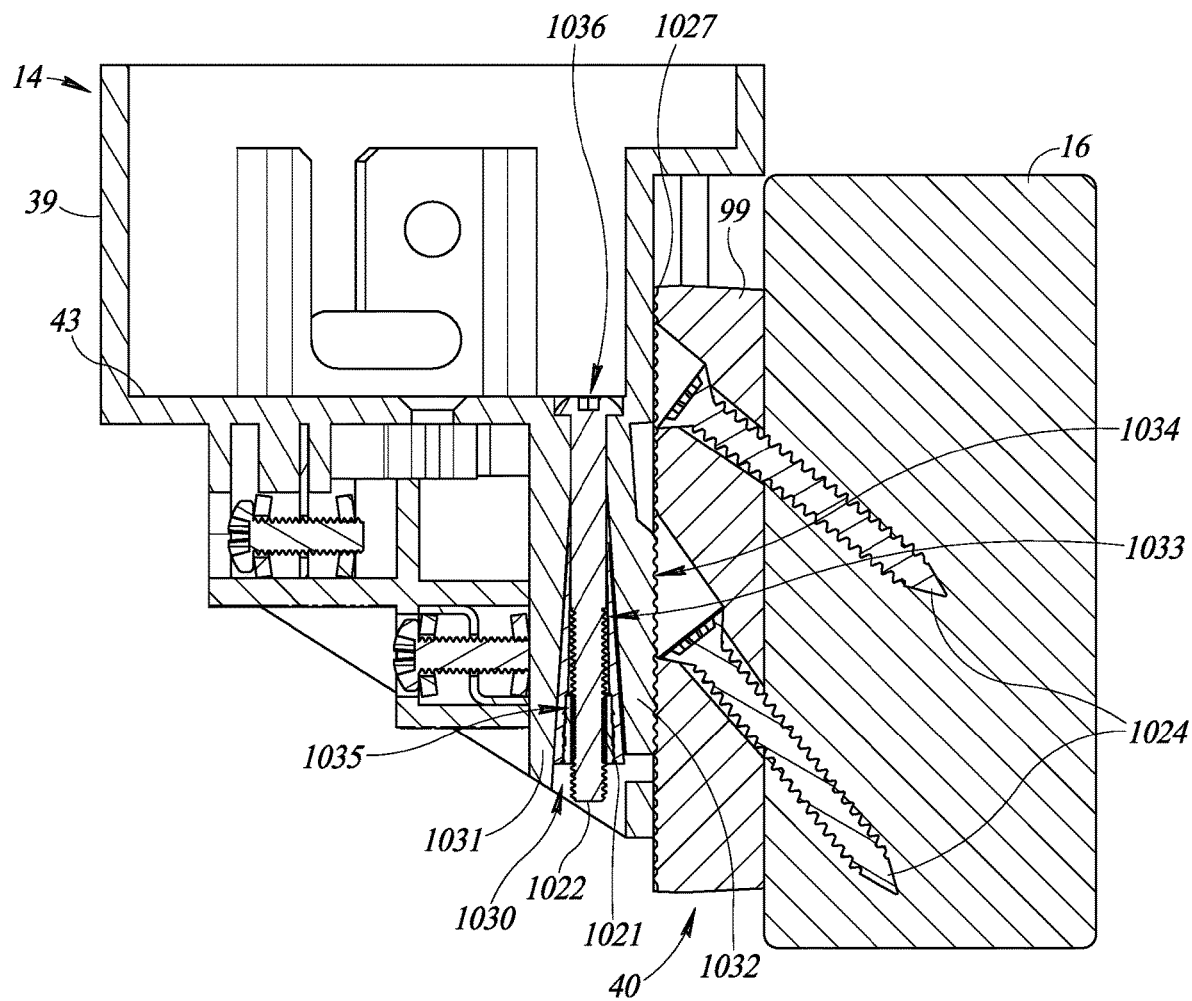
FIG. 14 is a cross-sectional view of the universal power interface system of FIG. 1, taken along lines 14-14.

As described above, each of the various electrical device modules 12, 112, 212, 312, 412 is removably coupleable to the universal power interface device 14. In particular, the universal power interface device 14 includes a housing 39, a mount assembly 40, a contact cover 41, and a plurality of contact assemblies 42, as illustrated in detail in FIGS. 9-14. For example, FIG. 9 illustrates an exploded view of the universal power interface device 14. FIG. 9A is a detail view of the housing 39. FIG. 10 illustrates a rear elevational view of the universal power interface device 14, with certain components, such as the contact cover 41, removed for clarity of illustration and description. FIG. 11 is a front elevational view of the universal power interface system 10 of FIG. 1 with certain components removed for clarity of illustration and description. FIGS. 12-13 are skewed isometric views of the universal power interface system 10 of FIG. 1, with certain components removed for clarity of illustration and description, illustrating various perspectives of the universal power interface device 14. FIG. 14 is a cross-sectional view of the universal power interface system 10 of FIG. 1, taken along lines 14-14.

The housing 39 is partitioned longitudinally via a partition wall 43 that divides the housing 39 into the receptacle region 17 and a rear region 44. As described above, the receptacle region 17 is sized and shaped to removably coupleably receive any one of the various electrical device modules, e.g., electrical device modules 12, 112, 212, 312, 412, etc. In particular, the partition wall 43 includes five contact pin receiving apertures 45A, 45B, 45C, 45D, and 45E that extend therethrough. The contact pin receiving aperture 45A has a generally skewed oval shape and the contact pin receiving aperture 45B also has a generally skewed oval shape. However, a length of the contact pin receiving aperture 45A is longer than a length of the contact pin receiving aperture 45B along long axes thereof. The contact pin receiving aperture 45C has a generally cylindrical shape. As illustrated in FIG. 11, the contact pin receiving apertures 45A, 45B, 45C, 45D, and 45E are angularly oriented relative to a central vertical axis 46 of the housing 39. More particularly, a central vertical pin axis 47 extends across a center of the contact pin receiving apertures 45A, 45B, 45C, 45D, and 45E. The central vertical pin axis 47 is oriented relative to the central vertical axis 46 of the housing 39 at an angle β. In some embodiments, the angle β can be approximately 20 degrees. Other angular orientations, however, are within the scope of the disclosed subject matter. For example, in some embodiments, the angle β can range from between 5 to 40 degrees. In general, the angle β is configured to correspond to the angle α to support a rotary or a twist-lock coupling with the electrical device modules, e.g., electrical device modules 12, 112, 212, 312, 412, etc.

The contact pin receiving aperture 45E is generally similar to the contact pin receiving aperture 45A but is a mirror image of the contact pin receiving aperture 45A relative to a central horizontal pin axis 48, which is generally perpendicular to the central vertical pin axis 47. Similarly, the contact pin receiving aperture 45D is generally similar to the contact pin receiving aperture 45B but is a mirror image of the contact pin receiving aperture 45B relative to the central horizontal pin axis 48. As described above, the contact pin receiving apertures 45A, 45B, 45C, 45D, and 45E are sized and shaped to facilitate a rotary or twist-lock coupling of the various electrical device modules 12, 112, 212, 312, 412, etc. In particular, during installation, a first contact pin, e.g., contact pin 26A, extends through contact pin receiving aperture 45A, with a surface of the first contact pin, e.g., contact pin 26A, abutting against a first side surface 49A. A second contact pin, e.g., contact pin 26B, extends through contact pin receiving aperture 45B, with a surface of the second contact pin, e.g., contact pin 26B, abutting against a second side surface 49B. A third contact pin, e.g., contact pin 26C, extends through the contact pin receiving aperture 45C. A fourth contact pin, e.g., contact pin 26D, extends through the contact pin receiving aperture 45D, with a surface of the fourth contact pin, e.g., contact pin 26D, abutting a fourth side surface 49D' of the contact pin receiving aperture 45D. A fifth contact pin, e.g., contact pin 26E, extends through the contact pin receiving aperture 45E, with a surface of the fifth contact pin, e.g., contact pin 26E, abutting a fifth side surface 49E' of the contact pin receiving aperture 45E.

To complete the installation, as any one of the various electrical device modules described herein, are rotated, the first contact pin, e.g., contact pin 26A, is rotated along the contact pin receiving aperture 45A, with a surface of the contact pin, e.g., contact pin 26A, abutting against an opposing first side surface 49A'. Similarly, the second contact pin, e.g., contact pin 26B, is rotated along the contact pin receiving aperture 45B, with a surface of the contact pin, e.g., contact pin 26B, abutting against an opposing second side surface 49B'. Similarly, the fourth contact pin, e.g., contact pin 26D, is rotated along the contact pin receiving aperture 45D, with a surface of the contact pin, e.g., contact pin 26D, abutting against an opposing fourth side surface 49D. Likewise, the fifth contact pin, e.g., contact pin 26E, is rotated along the contact pin receiving aperture 45E, with a surface of the contact pin, e.g., contact pin 26E, abutting against an opposing fifth side surface 49E.

As illustrated in detail in FIGS. 11-13, the housing 39 includes a locking mechanism 50 that locks any one of the electrical device modules described herein upon installation. In particular, the housing 39 includes an upper locking structure 51 and a lower locking structure 52. Each of the locking structures 51, 52 extends outwardly longitudinally from the partition wall 43 and inwardly toward a center of the housing 39 from a radial surface 53 of the housing 39. The upper locking structure 51 includes a substantially L-shaped recess 54 with a first recess portion 55 being generally aligned with the first side surface 49A of the contact pin receiving aperture 45A. A second recess portion 56 of the L-shaped recess 54 generally follows an arcuate path along the skewed oval shape of the contact pin receiving aperture 45A, for example, and extends through the housing 39. The upper locking structure 51 also includes an upper lock aperture 58 that extends therethrough.

The lower locking structure 52 also includes a substantially L-shaped recess 59 with a first recess portion 60 being generally aligned with the opposing fifth side surface 49E' of the contact pin receiving aperture 45E. A second recess portion 61 of the L-shaped recess 59 generally follows an arcuate path along the skewed oval shape of the contact pin receiving aperture 45E, for example, and extends through the housing 39. The lower locking structure 52 also includes a lower lock aperture 62 that extends therethrough.

Thus, when any one of the electrical device modules described herein is coupled to the universal power interface device 14, the electrical device module is inserted in the receptacle region 17. The connecting tabs, e.g., connecting tab 32, pass through corresponding first recess portion 55 of the upper locking structure 51 and first recess portion 60 of the lower locking structure 52 at least until outer rim portions, e.g., outer rim portions 29, abut contact surfaces 18, 65 of corresponding upper and lower locking structures 51, 52 and the connecting tabs 32 are positioned in the corresponding second recess portion 56 of the upper locking structure 51 and the second recess portion 61 of the lower locking structure 52. Moreover, in this manner, each connecting pin, e.g., connecting pins 26A, 26B, 26C, 26D, and 26E, protrudes through corresponding connecting pin apertures, e.g., connecting pin apertures 45A, 45B, 45C, 45D, and 45E. Thereafter, any one of the electrical device modules described herein is rotated in a direction R1, whereby the connecting tabs 32 are moved along corresponding second recess portions 56, 61. As the electrical device module, e.g., electrical device module 12, 112, 212, 312, etc. is rotated, the slits, e.g., slits 34, permit locking tabs, e.g., locking tab 33, to move or deform inwardly when there is contact with the corresponding upper and lower locking structures 51, 52. As the electrical device module, e.g., electrical device modules 12, 112, 212, 312, etc. is rotated whereby the connecting tab 32 moves along the second recess portions 56, 61 of corresponding upper and lower locking structures 51, 52, when the locking tab 33 aligns with corresponding upper and lower lock apertures 58, 62, the locking tabs 33 return to their initial, substantially undeformed state and lock into the corresponding upper and lower lock apertures 58, 62.

During removal of any one of the electrical device modules described herein, e.g., electrical device module 12, 112, 212, 312, etc., the electrical device module is rotated in a direction R2, which causes the locking tabs 33 to return to a deformed state, e.g., move inwardly, as the connecting tabs 32 move along second recess portions 56, 61 of corresponding upper and lower locking structures 51, 52. When the connecting tabs 32 are positioned in the first recess portions 55, 60 of corresponding upper and lower locking structures 51, 52, the locking tabs 33 return to the undeformed state, and the electrical device module, e.g., electrical device module 12, 112, 212, 312, etc., is moved outwardly with the connecting tabs 32 following path defined by the first recess portions 55, 60 of the corresponding upper and lower locking structures 51, 52, until the electrical device module, e.g., electrical device module 12, 112, 212, 312, etc., is removed from the receptacle region 17 of the housing 39.

As described above, in some implementations, the electrical device module, e.g., electrical device module 412, may include a biasing mechanism 480. In the implementations where the universal power interface system 10 includes the electrical device module 412 removably coupled to the universal power interface device 14, the electrical device module 412 is inserted in the receptacle region 17. The connecting tabs 432 pass through corresponding first recess portion 55 of the upper locking structure 51 and first recess portion 60 of the lower locking structure 52 at least until outer rim portions, e.g., outer rim portions 29, abut contact surfaces 18, 65 of corresponding upper and lower locking structures 51, 52 and the connecting tabs 432 are positioned in the corresponding second recess portion 56 of the upper locking structure 51 and the second recess portion 61 of the lower locking structure 52. Moreover, in this manner, each connecting pin, e.g., connecting pins 26A, 26B, 26C, 26D, and 26E, protrudes through corresponding connecting pin apertures, e.g., connecting pin apertures 45A, 45B, 45C, 45D, and 45E.

Thereafter, the electrical device module 412 is rotated in the direction R1, whereby the connecting tabs 432 are moved along corresponding second recess portions 56, 61. As the electrical device module 412 is rotated, the end 486 of the biasing shaft 483 contacts one of the upper and lower locking structures 51, 52, which causes frictional forces to depress the end 486 of the biasing shaft 483. In particular, the biasing mechanism 480 is sized and shaped such that the frictional forces overcome the biasing forces caused by the biasing member 485. As the end 486 is aligned with one of the upper and lower lock apertures 58, 62, the biasing forces of the biasing member 485 overcome the frictional forces, and the end 486 moves into one of the upper and lower lock apertures 58, 62.

During removal of the electrical device module 412, the end 484 of the biasing shaft 483 can be depressed, which causes the end 486 to at least partially move inwardly, away from one of the upper and lower lock apertures 58, 62. The electrical device module can, thereafter, be rotated in the direction R2, and the connecting tabs 432 can move along one of second recess portions 56, 61 of one of upper and lower locking structures 51, 52. When the connecting tabs 432 are positioned in the first recess portions 55, 60 of corresponding upper and lower locking structures 51, 52, the end 486 of the biasing shaft 483 may return to a depressed state due to frictional forces, and the electrical device module 412 is moved outwardly with the connecting tabs 432 following paths defined by the first recess portions 55, 60 of the corresponding upper and lower locking structures 51, 52, until the electrical device module 412 is removed from the receptacle region 17 of the housing 39.

The universal power interface system 10 advantageously permits concurrent mechanical and electrical coupling of the electrical power interface device 14 to any one of the various electrical device modules described herein. Such dual coupling feature permits the electrical device module interface 14 to support weights of a wide variety of electrical devices. For example, the upper and lower locking structures 51, 52 are sized and shaped to support weights of ceiling fans, lighting fixtures, power outlets, and any number of electrical devices. The electrical coupling of the electrical device modules is supported, at least in part, by the contact pins, e.g., contact pins 26A, 26B, 26C, 26D, and 26E, protruding through corresponding connecting apertures 45A, 45B, 45C, 45D, and 45E, and coupling to contact assemblies 42.

As illustrated in detail in FIGS. 9, 9A, and 10, the contact assemblies 42 include five electrical contact assemblies 63A, 63B, 63C, 63D, 63E (collectively referred to sometimes as reference numeral 63) and a neutral contact assembly 64. Each of the five electrical contact assemblies 63 is generally similar, thus in the interest of brevity, only the electrical contact assembly 63A will be described in detail. The electrical contact assembly 63A includes an electrical contact member 65A, a pair of wire clamp plates 66A (collectively referred to as reference numeral 66), and a clamp fastener 67A (collectively referred to as reference numeral 67). The electrical contact member 65A includes a clamp flange 68A and a pin flange 69A. The pin flange 69A has an irregular shape to define a contact pin receptacle 70A that is sized and shaped to removably coupleably receive a contact pin, e.g., contact pins 26A, 26B, 26C, 26D, and 26E. More particularly, the pin flange 69A is generally resilient, such that the pin flange 69A can deflect, deform, or otherwise move to removably receive the contact pin, e.g., contact pins 26A, 26B, 26C, 26D, and 26E. The clamp flange 68A extends outwardly from the pin flange 69A and includes a clamp aperture 71A. The pair of wire clamp plates 66A are positioned to be spaced apart from the clamp flange 68A and also include clamp flange apertures 72A. The pair of wire clamp plates 66A are positioned relative to the clamp flange 68A such that the clamp flange apertures 72A are generally aligned with the clamp aperture 71A and wire gaps 73 are defined between the clamp flange 68A and the adjacent wire clamp plates 66A. Each of the clamp aperture 71A and the clamp flange apertures 72A is sized and shaped to receive the clamp fastener 67A. In this manner, wires can be received in either of the wire gaps 73, and as the clamp fastener 67A is rotatably moved via fastening, the wire gaps 73 are reduced to clamp any wire received in the wire gaps 73.

The neutral contact assembly 64 is generally configured to be a dummy contact assembly. More particularly, the neutral contact assembly 64 is configured to provide a support structure that is not electrically coupled to power delivery systems, for example. Rather, in some implementations, for example, when the universal power interface system 10 includes an electrical device module 12 that comprises a light switch 20, unused neutral wires can be supported via the neutral contact assembly 64. As illustrated in FIGS. 9, 9A, and 10, the neutral contact assembly 64 includes a neutral pin flange 74, the pair of wire clamp plates 66, and the clamp fastener 67. The neutral pin flange 74 has a generally z-shaped structure with a clamp aperture 75 extending through a middle flange 76. The pair of wire clamp plates 66 are positioned to be spaced apart from the middle flange 76 and include clamp flange apertures 77. The pair of wire clamp plates 66 are positioned relative to the middle flange 76 such that the clamp flange apertures 77 are generally aligned with the clamp aperture 75 and wire gaps 73 are defined between the middle flange 76 and the adjacent wire clamp plates 66. Each of the clamp aperture 75 and the clamp flange apertures 77 are sized and shaped to receive the clamp fastener 67. In this manner, wires can be received in either of the wire gaps 73, and as the clamp fastener 67 is rotatably moved via fastening, the wire gaps 73 are reduced to clamp any wire received in the wire gaps 73.

The electrical contact assemblies 63 are supportably positioned in the housing 39. In particular, the housing 39 includes horizontal support plates 78A, 78B, 78C, and 78D that extend outwardly from the partition wall 43 to define receiving surfaces 79A, 79B, 79C, and 79D. The receiving surfaces 79A, 79B, 79C, and 79D, along with a lower surface 80 of the housing 39 are sized and shaped to receive corresponding electrical contact assemblies 42. A prong tab 81 extends from an upper surface 83 of the housing 39 and a prong tab 84 extends from the lower surface 80 of the housing 39. Prong tab 82A extends outwardly from the receiving surface 79A and a prong tab 82A' extends outwardly from a lower surface that is opposite to the receiving surface 79A, prong tab 82B extends outwardly from the receiving surface 79B and a prong tab 82B' extends outwardly from a lower surface that is opposite to the receiving surface 79B, prong tab 82C extends outwardly from the receiving surface 79C and a prong tab 82C' extends outwardly from a lower surface that is opposite to the receiving surface 79C, and prong tab 82D extends outwardly from the receiving surface 79D and a prong tab 82D' extends outwardly from a lower surface that is opposite to the receiving surface 79D.

Support flanges 86A, 86B, 86C, 86D, and 86E (collectively referred to sometimes by reference numeral 86) that have a generally t-shaped structure extend outwardly from the partition wall 43. Support tabs 87A, 87B, 87C, 87D, and 87E (collectively referred to by reference numeral 87) also extend outwardly from the partition wall 43. Each support tab 87 is spaced apart from the support flange 86 to coupleably receive the corresponding electrical contact assembly 63. In addition, a clamp flange 88 extends outwardly from the partition wall 43 and includes a plurality of semi-cylindrical shaped cut-outs 89A, 89B, 89C, 89D, and 89E.

As illustrated in FIGS. 9, 9A, and 10, each of the electrical contact assemblies 63 is generally supported in the housing 39 in a similar manner. Thus, in the interest of brevity, the support of one electrical contact assembly 63A will be described in more detail. As illustrated in detail in FIGS. 9, 9A and 10, the electrical contact assembly 63A is positioned on the receiving surface 79A, with the semi-cylindrical shaped cut-out 89A aligned with the clamp fastener 67A, such that the clamp fastener 67A is accessible for coupling and decoupling. The clamp flange 68A is sandwiched between the support tab 87A and the support flange 86A. Prongs of the pin flange 69A abut prong tab 81 and prong tab 82A, such that when the electrical contact assembly 63A is received in the housing 39, contact pin receptacle 70A is positioned proximal to the opposing first side surface 49A' of the contact pin receiving aperture 45A. In a similar manner, when electrical contact assembly 63B is coupleably received in the housing 39, the contact pin receptacle 70B of the electrical contact assembly 63B is positioned proximal to the opposing first side surface 49B' of the contact pin receiving aperture 45B. Similarly, when electrical contact assembly 63C is coupleably received in the housing 39, the contact pin receptacle 70C of the electrical contact assembly 63C is aligned with the contact pin receiving aperture 45C. Similarly, when electrical contact assembly 63D is coupleably received in the housing 39, the contact pin receptacle 70D of the electrical contact assembly 63D is positioned proximal to the opposing first side surface 49D of the contact pin receiving aperture 45D. Likewise, when electrical contact assembly 63E is coupleably received in the housing 39, the contact pin receptacle 70E of the electrical contact assembly 63E is positioned proximal to the opposing first side surface 49E of the contact pin receiving aperture 45E.

As illustrated in FIGS. 1 and 9 in detail, the contact cover 41 is coupled to the housing 39. The contact cover 41, when coupled to the housing 39, overlays the electrical contact assemblies 63. The contact cover 41 includes a plurality of ground wire apertures 90, first circuit hot wire apertures 91, first circuit neutral wire apertures 92, second circuit hot wire apertures 93, and second circuit neutral wire apertures 94. Each wire aperture 90, 91, 92, 93, and 94 is sized and shaped to receive a wire. For example, a building may have a power source that delivers power to various outlets, e.g., light switch, power outlet, light fixture, fans, etc. The power from the power source is delivered via one or more wires. For example, the one or more wires can comprise neutral wire(s) that are received via one or more of first and second circuit neutral wire apertures 92, 94. For example, the one or more wires can comprise hot wire(s) that are received via one or more of first and second circuit hot wire apertures 91, 93. For example, one or more wires can comprise ground wire(s) that are received via one or more ground wire apertures 90.

The first and second circuit hot wire apertures 91, 93 are generally aligned with wire gaps 73 of respective electrical contact assemblies 63B and 63D. Similarly, first and second circuit neutral wire apertures 92, 94 are generally aligned with wire gaps 73 of respective electrical contact assemblies 63A and 63E. Similarly, ground wire apertures 90 are generally aligned with wire gaps 73 of electrical contact assembly 63C. Thus, when wire(s) are received from the power source in any of the wire apertures 90, 91, 92, 93, or 94, the clamp fastener 67 of the corresponding electrical contact assembly 63 can be rotated to couple or decouple the wire(s) to the electrical contact assembly 63.

As described above, in some implementations, for example, an electrical device module 12 that comprises a light switch 20, neutral wires may not be utilized. In such implementations, supporting unused neutral wires is advantageous. The contact cover 41 includes a switch neutral housing 95 that extends outwardly from a surface of the contact cover 41 and is coupled thereto. The switch neutral housing 95 is generally hollow and sized and shaped to receive therein the neutral contact assembly 64. The switch neutral housing 95 includes a clamp fastener aperture 96 that is sized and shaped to receive the clamp fastener 67 of the neutral contact assembly 64 and provide access thereto. The switch neutral housing 95 also includes a plurality of neutral switch wire apertures 97. The neutral switch wire apertures 97 are generally sized and shaped to align with wire gaps 73 of the neutral contact assembly 64. Thus, neutral wire(s), for example, for an electrical device module 12 comprising the light switch 20, are received in one or more of the neutral switch wire aperture(s) 97. The clamp fastener 67 of the neutral contact assembly 64 can be rotated to couple or decouple the neutral wire(s) to the neutral contact assembly 64.

As described above, the universal power interface device 14 is generally operable to removably coupleably receive various electrical device modules, e.g., electrical device module 12, 112, 212, 312, 412, etc., in a wide variety of configurations, arrangements, and orientations. The arrangement of the electrical contact assemblies 63 supportably received in the universal interface device 14 allow the electrical device modules to be received in the 0 degree orientation or the 180 degree rotated orientation. For example, contact pin 26B or contact pin 26D of an electrical device module, e.g., electrical device modules 12, 112, 212, 312, 412, etc., can be coupleably received in either one of contact pin receiving aperture 45B or contact pin receiving aperture 45D to electrically couple to corresponding electrical contact assemblies 63B, 63D. Similarly, contact pin 26A or contact pin 26E of an electrical device module, e.g., electrical device modules 12, 112, 212, 312, 412, etc., can be coupleably received in either one of contact pin receiving aperture 45A or contact pin receiving aperture 45E to electrically couple to corresponding electrical contact assemblies 63A, 63E. Thus, the universal interface device 14 can symmetrically coupleably receive various electrical device modules in 0 degree or 180 degree rotated orientations, including ones that may have a three-way or four way light switch, 220V/240V power outlet, ceiling fans, lighting fixtures, etc.

With reference to FIGS. 1, 2, 3, 9, 9A, and 14, the universal power interface device 14 is coupleable to a wide variety of structures. For example, the universal power interface device 14 can be coupled to any wall or ceiling structure. The wall or ceiling structure may have an aperture 98 to expose the receptacle region 17 of the universal power interface device 14. For example, FIG. 2 illustrates the aperture 98 disposed in the wall 15. In some implementations, the aperture 98 can be disposed in the ceiling. Moreover, in some implementations, the universal power interface device 14 can optionally be coupled to the stud 16 via the mount assembly 40. In particular, the mount assembly 40 includes a mounting block 99, a wedge member 1021, and an adjustment fastener 1022. The mounting block 99 includes a block member 1023 that is sized and shaped to abut or contact a building structure, such as the stud 16. In other implementations, however, the building structure may include other structures, such as dry walls, beams, pillars, columns, etc. For example, in implementations where the universal power interface device 14 is coupled to a ceiling structure, the block member 1023 may mate or contact with a beam that is typical in ceiling structures. As illustrated in FIG. 14 in detail, the mounting block 99 is removably coupled to the building structure, e.g., stud 16, via one or more building fasteners 1024. In some implementations, the building fasteners 1024 may be oriented to extend through the mounting block 99 and the stud 16 at an angular orientation relative to a central axis of the mounting block 99.

The mounting block 99 also includes a plate portion 1026 that peripherally extends around the block member 1023 and includes a plurality of block teeth 1027. The block teeth 1027 are sized and shaped to engage with portions of the housing 39. In particular, the housing 39 includes a pair of rail structures 1028 that extend outwardly from the partition wall 43 to define a channel 1029. The channel 1029 is sized and shaped to slideably couple the housing 39 to the plate portion 1026 of the mounting block 99. In this manner, the housing 39 can slide in a transverse direction relative to the plate portion 1026 of the mounting block 99.

As illustrated in FIGS. 1, 9, 9A, and 14 in detail, the housing 39 includes a chamber 1030 that is defined, at least in part, by a first side wall 1031 and a second side wall 1032. The first and second side walls 1031, 1032 angularly extend outwardly or taper out from the partition wall 43 to define a wedge receiving region 1033. The second side wall 1032 includes a plurality of block engaging teeth 1034. The block engaging teeth 1034 are sized and shaped to engage with the block teeth 1027 of the mounting block 99.

The chamber 1030 is sized and shaped to receive wedge member 1021 of the mount assembly 40. The wedge member 1021 has a generally trapezoidal shape with sides tapering out. A wedge block aperture 1035 extends through the wedge member 1021 and is generally aligned with a partition wall aperture 1036 that extends through the partition wall 43. Both the wedge block aperture 1035 and the partition wall aperture 1036 are sized and shaped to coupleably receive the adjustment fastener 1022. Thus, when the adjustment fastener 1022 is rotated to fasten to the wedge member 1021, such rotation causes the second side wall 1032 of the housing 39 to move and the block engaging teeth 1034 to engage with the block teeth 1027 of the mounting block 99. Conversely, when the adjustment fastener 1022 is rotated to unfasten from the wedge member 1021, such rotation causes the second side wall 1032 of the housing 39 to move and the block engaging teeth 1034 to at least partially disengage with the block teeth 1027 of the mounting block 99. As illustrated in FIG. 2, for example, a head of the adjustment fastener 1022 is accessible from the receptacle region 17 of the universal power interface device 14. In this manner, the adjustment fastener 1022 can be unfastened or loosened which causes at least partial disengagement of the block engaging teeth 1034 with the block teeth 1027, which permits the housing 39 to be slideably moveable via rail structures 1028 in the channel 1029. After a desired position of the housing 39 is reached, the adjustment fastener 1022 can be fastened or tightened, which causes the block engaging teeth 1034 to engage with the block teeth 1027 to rigidly position the housing 39.

Figure 15A:
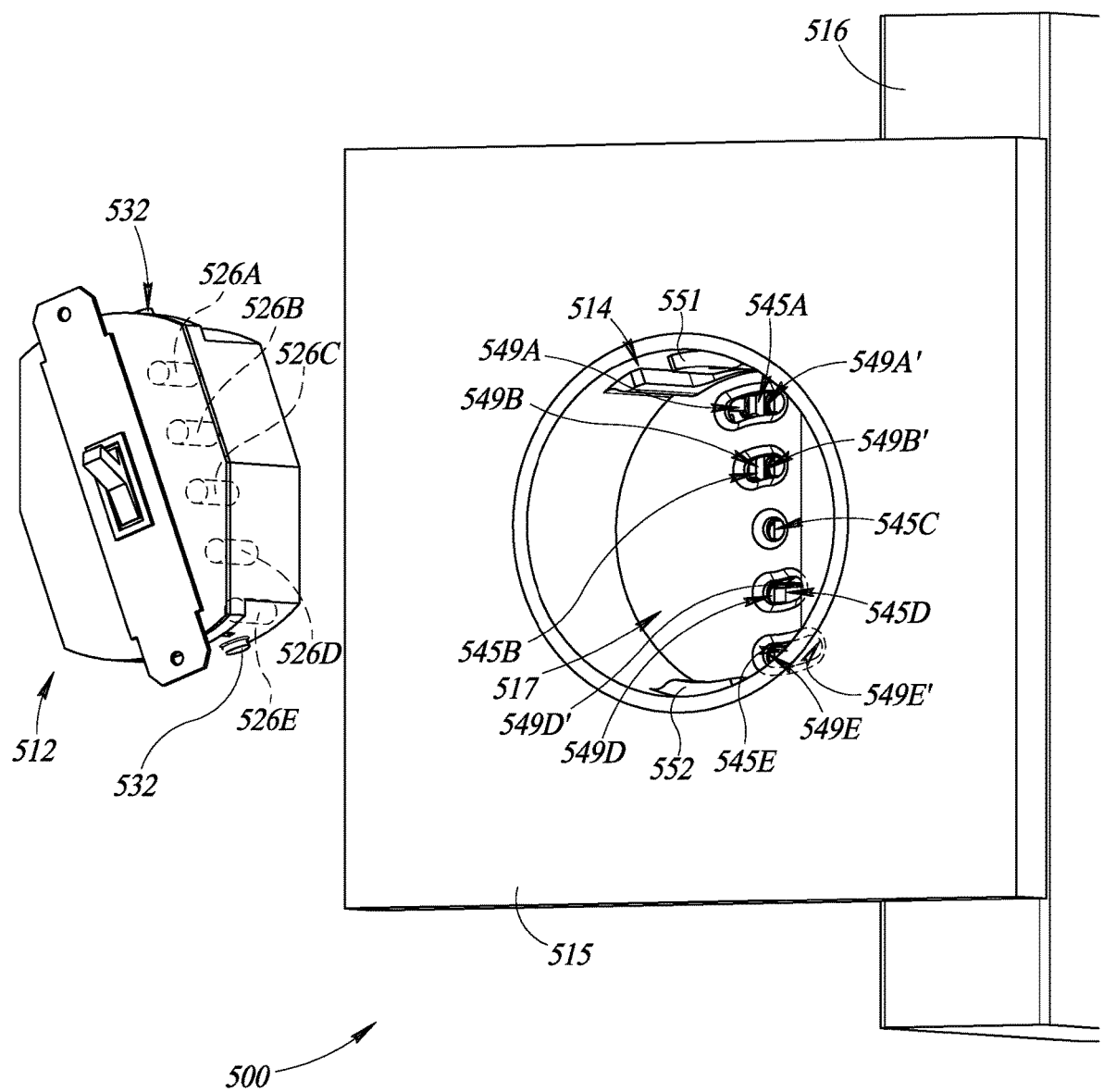
FIG. 15A is a skewed isometric view of the universal power system of FIG. 1, illustrating an uninstalled or pre-installed configuration.
Figure 15B:
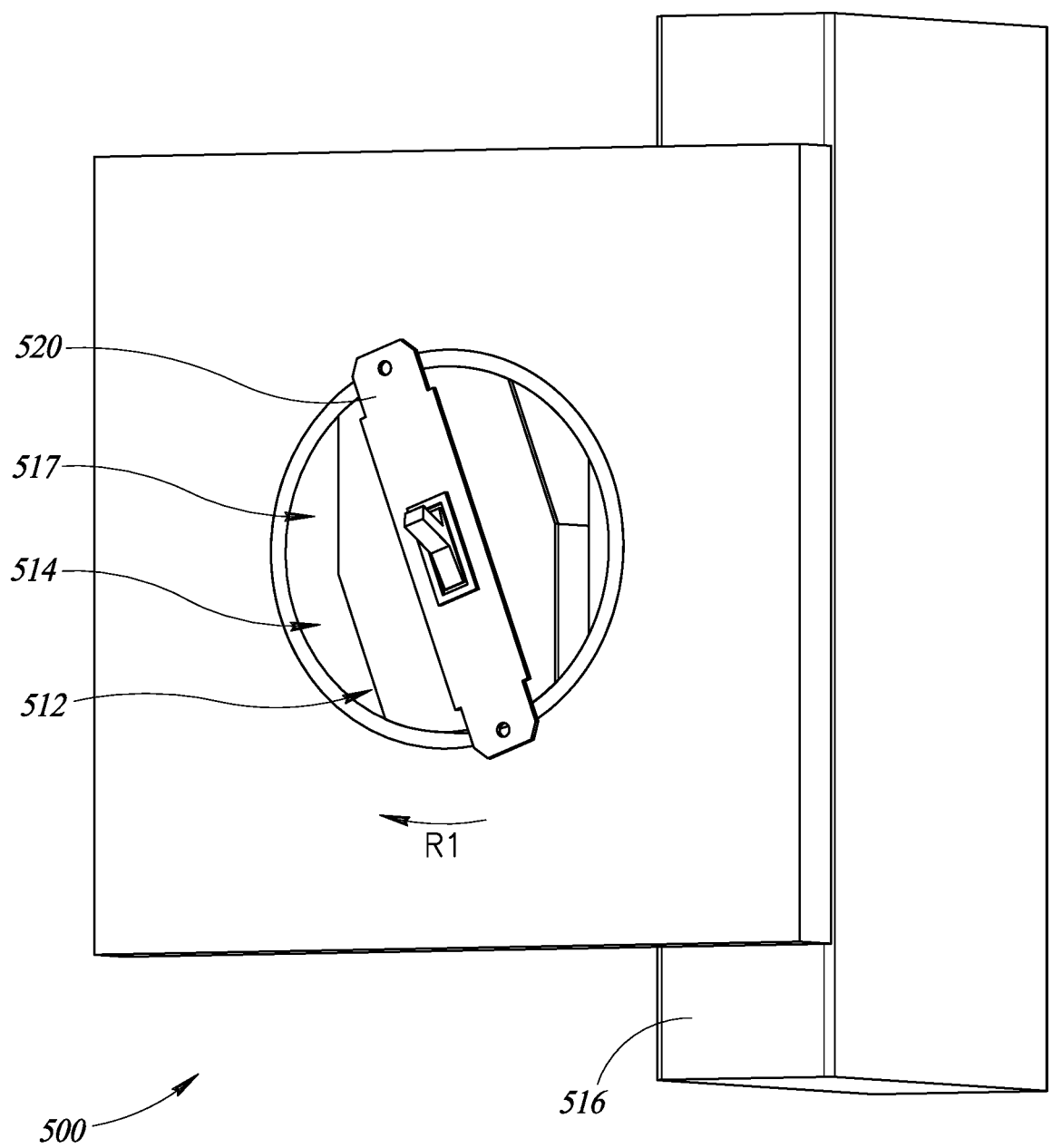
FIG. 15B is a skewed isometric view of the universal power system of FIG. 1, illustrating an insertion configuration.
Figure 15C:
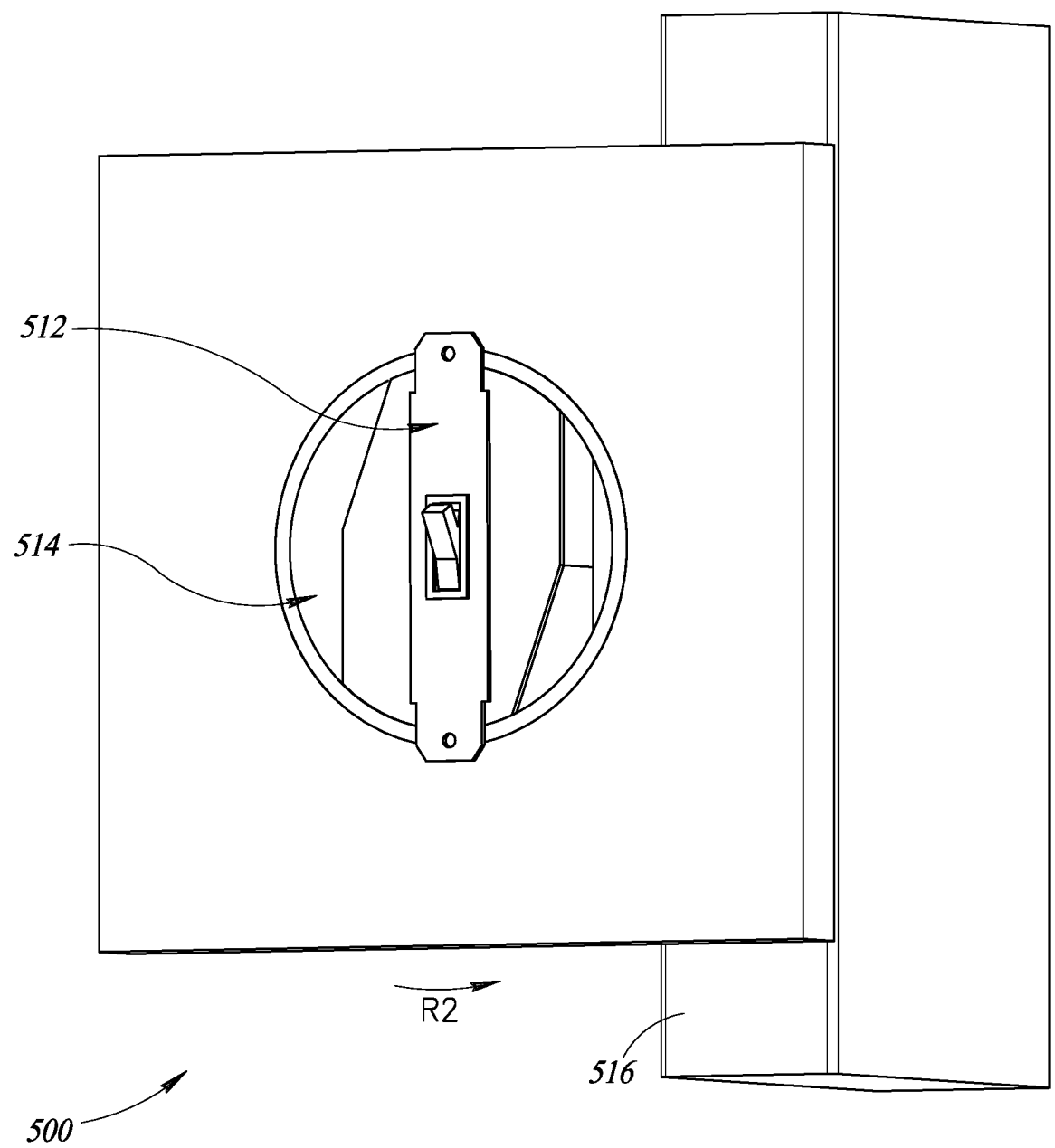
FIG. 15C is a skewed isometric view of the universal power system of FIG. 1, illustrating an installed configuration.

As described above, various implementations of the universal power interface systems facilitate removable rotatable coupling of a wide variety of electrical device modules. For example, FIGS. 15A, 15B, 15C illustrate various configurations of a universal power interface system 500. In particular, FIG. 15A illustrates a pre-installation configuration of the universal power interface system 500 having an electrical device module 512 and a universal power interface device 514. In this implementation, the electrical device module 512 is generally similar to the electrical device module 12 having a light switch 520 coupled thereto.

As illustrated in FIG. 15A, the universal power interface device 514 is coupled to a wall 515 and a stud 516. A receptacle region 517 of the universal power interface device 514 is exposed to receive therein the electrical device module 512.

FIG. 15B illustrates the universal power interface system 500 in an insertion configuration. In the insertion configuration, the electrical device module 512 is inserted in the receptacle region 517 of the universal power interface device 514. As described above, when the electrical device module 512 is inserted in the receptacle region 517, contact pins 526A, 526B, 526C, 526D, and 526E are received in corresponding contact pin receiving apertures 545A, 5456, 545C, 545D, and 545E. In particular, a surface of the contact pin 526A abuts a first side surface 549A, a surface of the contact pin 5266 abuts a second side surface 5496, a surface of the contact pin 526D abuts a fourth side surface 549D', and a surface of the contact pin 526E abuts a fifth side surface 549E'. Moreover, as described above, as the electrical device module 512 is inserted in the receptacle region 517, connecting tabs 532 pass through first recess portion, e.g., first recess portion 55, of upper locking structure 551, e.g., upper locking structure 51, and first recess portion, e.g., first recess portion 60, of lower locking structure 552, e.g., lower locking structure 52.

Further, as described above, the electrical device module 512 is rotated in a direction R1 to mechanically and electrically couple the electrical device module 512 to the universal power interface device 514. In particular, rotation of the electrical device module 512 causes contact pins 526A, 5266, 526D, 526E to abut opposing first side surface 549A', opposing second side surface 5496', opposing fourth side surface 549D, and opposing fifth side surface 549E, respectively. Such rotary movement and positioning causes the contact pins 526A, 5266, 526D, and 526E to be received in corresponding pin receptacles, e.g., 70A, 70B, 70D, and 70E, of electrical contact assemblies, e.g., 63A, 63B, 63D, and 63E, to electrically couple the electrical device module 512. In addition, rotary movement of the electrical device module in the direction R1 causes the connecting tabs 532 to follow the arcuate path of second recess portion, e.g., second recess portion 56, of the upper locking structure 551, and second recess portion, e.g., second recess portion 61, of lower locking structure 552. As locking tabs, e.g., locking tabs 33, contact upper and locking structures 551, 552, the locking tabs move or deform inwardly until the locking tabs, e.g., locking tabs 33, align with corresponding upper and lower lock apertures, e.g., upper and lower lock apertures 58, 62.

When the locking tabs return to their initial, substantially undeformed state, they lock into the corresponding upper and lower lock apertures, e.g., upper and lower lock apertures 58, 62, as illustrated in FIG. 15C, which illustrates the universal power interface system 500 in an installed configuration. In the installed configuration, the coupling of the locking tabs, e.g., locking tabs 33, in the corresponding upper and lower lock apertures, e.g., upper and lower lock apertures 58, 62, along with the connecting tabs 532 being frictionally coupled within the second recess portions, e.g., second recess portions 56, 61, facilitates supporting a wide variety of weights of electrical device modules.

During removal of the electrical device module 512, the electrical device module 512 is rotated in a direction R2. Such rotation causes electrical and mechanical decoupling of the electrical device module 512 from the universal power interface device 514. In particular, rotation of the electrical device module 512 causes contact pins 526A, 526B, 526D, 526E to abut first side surface 549A, second side surface 549B, fourth side surface 549D', and fifth side surface 549E', respectively. Such rotary movement and positioning causes the contact pins 526A, 526B, 526D, and 526E to be moved away from corresponding pin receptacles, e.g., 70A, 70B, 70D, and 70E, of electrical contact assembles, e.g., 63A, 63B, 63D, and 63E, to electrically decouple the electrical device module 512. In addition, rotary movement of the electrical device module in the direction R2 causes the connecting tabs 532 to follow the arcuate path of second recess portion, e.g., second recess portion 56, of the upper locking structure 551, and second recess portion, e.g., second recess portion 61, of lower locking structure 552.

As locking tabs, e.g., locking tabs 33, contact upper and locking structures 551, 552, the locking tabs move or deform inwardly as the connecting tabs 532 move along second recess portions, e.g., second recess portions 56, 61 of corresponding upper and lower locking structures 551, 552. When the connecting tabs 532 are positioned in the first recess portions, e.g., first recess portions 55, 60, of corresponding upper and lower locking structures 551, 552, the locking tabs, e.g., locking tabs 33, return to the undeformed state, and the electrical device module 512 is in the inserted configuration illustrated in FIG. 15B. Thereafter, the electrical device module 512 is moved outwardly with the connecting tabs 532 following paths defined by the first recess portions, e.g., first recess portions 55, 60 of the corresponding upper and lower locking structures 551, 552, until the electrical device module 512 is removed from the receptacle region 517.

Figure 16:
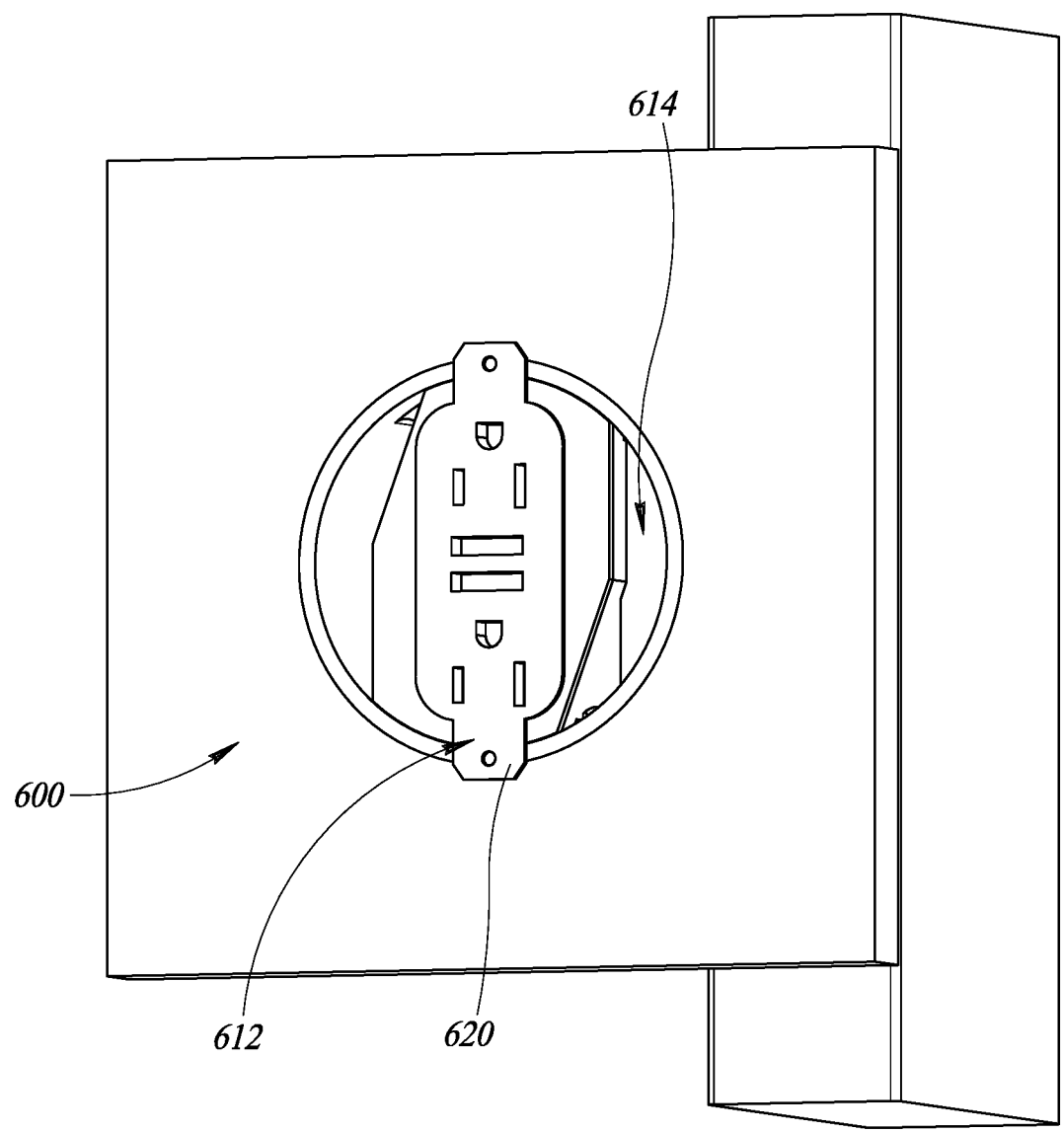
FIG. 16 is a skewed isometric view of a universal power interface system, according to another example implementation, illustrating an installed configuration.

While FIGS. 15A-15C illustrate an implementation of an universal power interface system 500 having an electrical device module 512 that includes a light switch 520, other implementations of the universal power interface systems can have similar configurations. For example, FIG. 16 illustrates a universal power interface system 600 in an installed configuration that includes an electrical device module 612 removably coupled to a universal power interface device 614. In this implementation, the electrical device module 612 includes a power outlet 620 coupled thereto.

Figure 17:
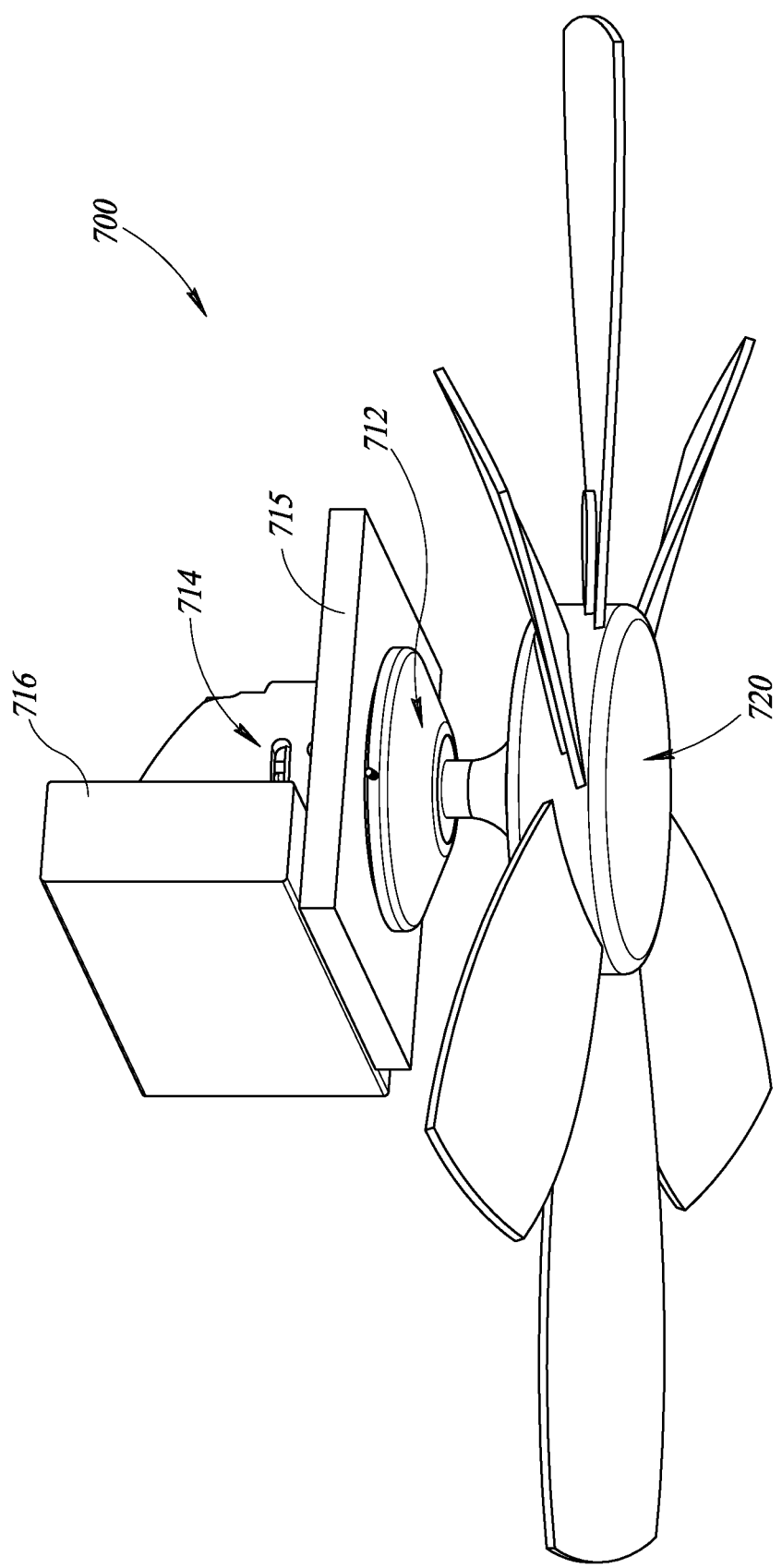
FIG. 17 is a skewed isometric view of a universal power interface system, according to another example implementation, illustrating an installed configuration.

For example, FIG. 17 illustrates a universal power interface system 700 in an installed configuration that includes an electrical device module 712 removably coupled to a universal power interface device 714. In this implementation, the electrical device module 712 is generally similar to the electrical device module 412, and includes a ceiling fan 720 coupled thereto. As illustrated in FIG. 17, the universal power interface device 714 is coupled to a ceiling structure that includes a ceiling 715 and a beam 716.

Figure 18:
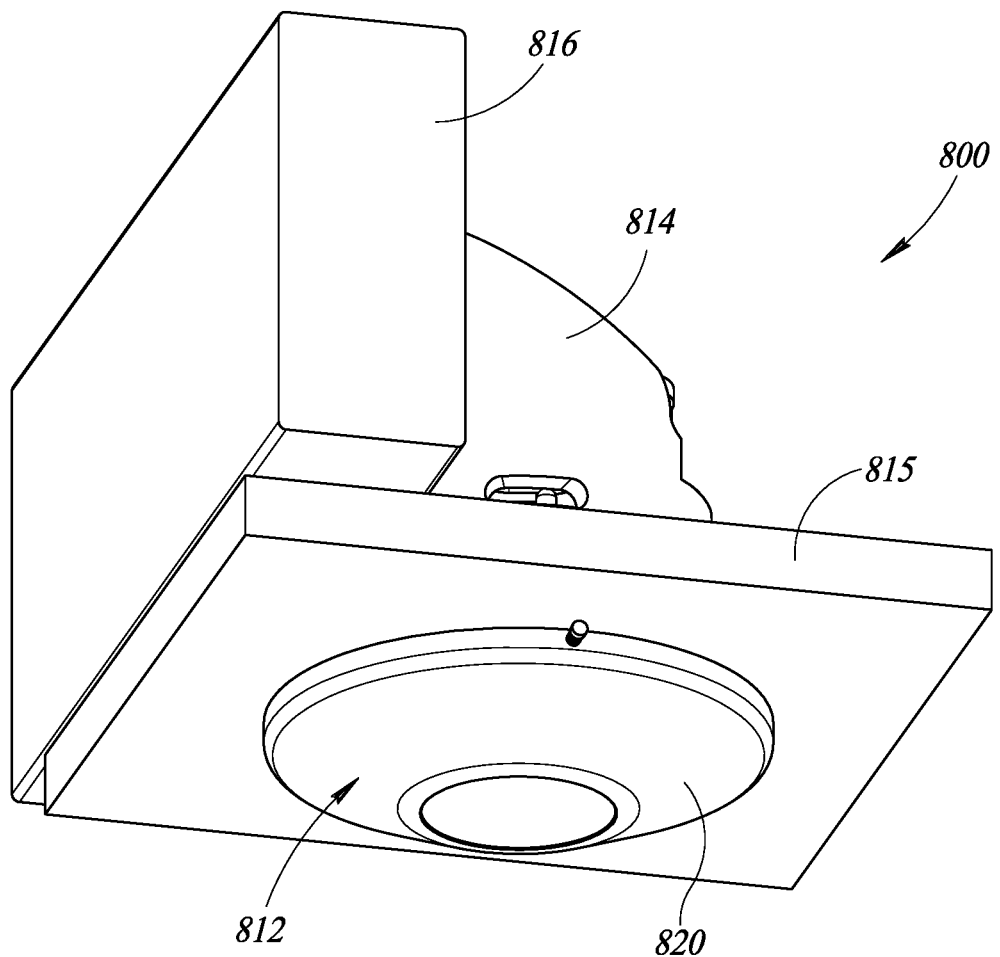
FIG. 18 is a skewed isometric view of a universal power interface system, according to another example implementation, illustrating an installed configuration.

For example, FIG. 18 illustrates a universal power interface system 800 in an installed configuration that includes an electrical device module 812 removably coupled to a universal power interface device 814. In this implementation, the electrical device module 812 is generally similar to the electrical device module 412, which includes a lighting fixture 820 coupled thereto. As illustrated in FIG. 18, the universal power interface device 814 is coupled to a ceiling structure that includes a ceiling 815 and a beam 816.

Moreover, the various embodiments or implementations described above can be combined to provide further embodiments. These and other changes can be made to the embodiments or implementations in light of the above-detailed description. In general, in the following claims, the terms used should not be construed to limit the claims to the specific embodiments disclosed in the specification and the claims, but should be construed to include all possible embodiments along with the full scope of equivalents to which such claims are entitled. Accordingly, the claims are not limited by the disclosure.

The invention claimed is:

1. A power interface system, comprising:
a power interface device coupleable to a structure, the power interface device including:
a receptacle region;
a plurality of pin receiving apertures including:
a first pin receiving aperture;
a second pin receiving aperture;
a third pin receiving aperture;
a fourth pin receiving aperture; and
a fifth pin receiving aperture, only the first, second, fourth, and fifth pin receiving apertures having substantially arcuate shapes; and
an electrical device module sized and shaped to be received in the receptacle region, the electrical device module having a plurality of contact pins, the plurality of contact pins including:
a first contact pin sized and shaped to be received in the first pin receiving aperture;
a second contact pin sized and shaped to be received in the second pin receiving aperture;
a third contact pin sized and shaped to be received in the third pin receiving aperture;
a fourth contact pin sized and shaped to be received in the fourth pin receiving aperture; and
a fifth contact pin sized and shaped to be received in the fifth pin receiving aperture, the electrical device module being rotatably moveable with respect to the receptacle region between an uncoupled orientation and a coupled orientation, wherein the first, second, fourth, and fifth contact pins are moveable along arcuate paths of respective first, second, fourth, and fifth pin receiving apertures when the electrical device module moves between the uncoupled and the coupled orientations, the electrical device module being secured to the power interface device in the coupled orientation.

2. The power interface system of claim 1, wherein at least one of the plurality of pin receiving apertures defines a rotary path, the electrical device module being rotatably moveable along the rotary path between the uncoupled orientation and the coupled orientation.

3. The power interface system of claim 2 wherein:
each of the first, second, third, and fourth pin receiving apertures have substantially arcuate shapes which are concentric with the rotary path.

4. The power interface system of claim 2 wherein the arcuate shape of the at least one of the plurality of pin receiving apertures has a first surface that is in contact with a corresponding contact pin in the uncoupled orientation, and a second surface that is opposite the first surface, the second surface in contact with the corresponding contact pin in the coupled orientation.

5. The power interface system of claim 1 wherein the contact pins of the electrical device module are angularly oriented relative to a central vertical axis of the electrical device module.

6. The power interface system of claim 1, comprising:
a plurality of electrical contact assemblies, each electrical contact assembly received in the power interface device and including a pin flange that is sized and shaped to coupleably receive the contact pin.

7. The power interface system of claim 1 wherein the power interface device includes a locking structure that is sized and shaped to secure the electrical device module in the coupled orientation.

8. The power interface system of claim 7 wherein:
the locking structure includes an upper locking structure and a lower locking structure, each of the upper and lower locking structures including corresponding recesses that are sized and shaped such that the electrical device module, when received in the receptacle region, moves along a rotary path between the uncoupled orientation and the coupled orientation.

9. The power interface system of claim 1 wherein the electrical device module includes at least one of a ceiling fan and a lighting fixture.

10. The power interface system of claim 1 wherein the electrical device module is moveable between the uncoupled orientation and the coupled orientation in an upright orientation and an inverted orientation, the electrical device module in the inverted orientation being 180 degrees from the upright orientation.

11. A universal interface device configured to couple to an electrical device module having a first contact pin, a second contact pin, a third contact pin, a fourth contact pin, and a fifth contact pin, the universal interface device comprising:
a first pin receiving aperture sized and shaped to receive the first contact pin;
a second pin receiving aperture sized and shaped to receive the second contact pin;
a third pin receiving aperture sized and shaped to receive the third contact pin;
a fourth pin receiving aperture sized and shaped to receive the fourth contact pin; and
a fifth pin receiving aperture sized and shaped to receive the fifth contact pin, only the first, second, fourth, and fifth pin receiving apertures having an arcuate shape which define a rotary path along which the first, second, fourth, and fifth contact pins of the electrical device module are moveable so that the electrical device module can rotate between a coupled configuration and an uncoupled configuration.

12. The universal interface device of claim 11 wherein the arcuate shape, the arcuate shape of the fifth- pin receiving aperture is a mirror image of the arcuate shape of the first pin receiving aperture about a central axis of the universal interface device.

13. The universal interface device of claim 11 comprising a housing that includes a receptacle region which is sized and shaped to receive the electrical device module.

14. The universal interface device of claim 13 wherein the housing includes a locking structure that is sized and shaped to secure the electrical device module in the coupled configuration.

15. A method comprising:
inserting an electrical device module having a first contact pin, a second contact pin, a third contact pin, a fourth contact pin, and a fifth contact pin in a power interface device having:
  a receptacle region,
  a first pin receiving aperture sized and shaped to receive the first contact pin,
  a second pin receiving aperture sized and shaped to receive the second contact pin,
  a third pin receiving aperture sized and shaped to receive the third contact pin,
  a fourth pin receiving aperture sized and shaped to receive the fourth contact pin, and
  a fifth pin receiving aperture sized and shaped to receive the fifth contact pin, only the first, second, fourth, and fifth pin receiving apertures having an arcuate shape which define a rotary path along which the first, second, fourth, and fifth contact pins of the electrical device module are moveable;
rotating the electrical device module with respect to the receptacle region in a first direction to couple the electrical device module to the power interface device.

16. The method of claim 15, comprising:
rotating the electrical device module in a second direction which is opposite the first direction to uncouple the electrical device module from the power interface device.

17. The method of claim 15 wherein rotating the electrical device module electrically couples the electrical device module to the power interface device and mechanically secures the electrical device module to the power interface device.

18. The method of claim 15, comprising coupling the power interface device to a ceiling structure.

19. The method of claim 18 wherein the electrical device module includes a ceiling fan coupled thereto.

* * * * *